(12) United States Patent
Wu et al.

(10) Patent No.: US 12,047,308 B2
(45) Date of Patent: Jul. 23, 2024

(54) METHOD AND DEVICE IN NODE USED FOR WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/242,541

(22) Filed: Sep. 6, 2023

(65) Prior Publication Data

US 2023/0412327 A1    Dec. 21, 2023

Related U.S. Application Data

(63) Continuation of application No. 17/955,553, filed on Sep. 29, 2022, now Pat. No. 11,791,954, which is a
(Continued)

(30) Foreign Application Priority Data

Sep. 24, 2019    (CN) .......................... 201910905498.9

(51) Int. Cl.
   *H04L 5/00*      (2006.01)
   *H04W 72/0446*   (2023.01)
   *H04W 72/23*     (2023.01)

(52) U.S. Cl.
   CPC .......... *H04L 5/0007* (2013.01); *H04L 5/0048* (2013.01); *H04L 5/0083* (2013.01); *H04W 72/0446* (2013.01); *H04W 72/23* (2023.01)

(58) Field of Classification Search
   CPC ... H04L 5/0007; H04L 5/0048; H04L 5/0083; H04L 1/08; H04L 5/1469; H04L 5/0094;
   (Continued)

(56) References Cited

U.S. PATENT DOCUMENTS 6,934,246 B2 *   8/2005   Park ..................... H04L 27/2602
                                                          370/208
7,065,150 B2 *   6/2006   Park ..................... H04L 27/2631
                                                          370/208
(Continued)

FOREIGN PATENT DOCUMENTS

CN        101919175 A    12/2010
CN        102684861 A     9/2012
(Continued)

OTHER PUBLICATIONS

Supplementary Search Report of Chinses patent application No. CN201910905498.9 dated Aug. 23, 2022.
(Continued)

*Primary Examiner* — Jay P Patel

(57) ABSTRACT

The present disclosure provides a method and a device in a node for wireless communication. A first node receives first information; receives a first signaling, the first signaling being used for indicating a first symbol set; then operates K radio signals respectively in K symbol groups in the first symbol set. The first symbol set comprises a first symbol subset and a second symbol subset, the first information is used for indicating a type of each multicarrier symbol in the first symbol set, and the first information is used for determining the first symbol subset and the second symbol subset; any of the K symbol groups belongs to one of the first symbol subset and the second symbol subset; each of the K radio signals carries a first bit block, the K radio signals respectively correspond to K first-type parameters.

20 Claims, 18 Drawing Sheets

K=3, K1=1, K-K1=2

Related U.S. Application Data continuation of application No. 17/011,995, filed on Sep. 3, 2020, now Pat. No. 11,502,789.

(58) Field of Classification Search
CPC . H04L 5/0078; H04L 27/2602; H04L 5/0053; H04W 72/0446; H04W 72/23; H04W 72/20; Y02D 30/70
See application file for complete search history.

(56) References Cited

U.S. PATENT DOCUMENTS

| | | | | |
|---|---|---|---|---|
| 9,432,818 | B2* | 8/2016 | Yu | H04W 4/08 |
| 10,735,170 | B2* | 8/2020 | Yang | H04L 5/0048 |
| 10,945,265 | B2* | 3/2021 | Somichetty | H04L 5/1469 |
| 11,510,114 | B2* | 11/2022 | Yiu | H04W 36/362 |
| 11,575,481 | B2* | 2/2023 | Han | H04W 80/02 |
| 11,856,614 | B2* | 12/2023 | Deenoo | H04W 72/0446 |
| 2004/0252631 | A1* | 12/2004 | Park | H04L 27/02 370/210 |
| 2004/0252775 | A1* | 12/2004 | Park | H04L 27/26265 375/260 |
| 2006/0072486 | A1* | 4/2006 | Park | H04L 27/2602 370/310 |
| 2013/0094410 | A1* | 4/2013 | Yang | H04W 72/21 370/280 |
| 2013/0279434 | A1 | 10/2013 | Dinan | |
| 2014/0056184 | A1* | 2/2014 | Yang | H04L 1/1861 370/280 |
| 2014/0133373 | A1* | 5/2014 | Han | H04L 5/0055 370/329 |
| 2016/0007324 | A1* | 1/2016 | Lee | H04L 1/1671 370/329 |
| 2017/0207895 | A1* | 7/2017 | Yang | H04W 72/23 |
| 2017/0215157 | A1* | 7/2017 | Yang | H04W 52/146 |
| 2017/0215172 | A1* | 7/2017 | Yang | H04L 27/2601 |
| 2018/0242317 | A1* | 8/2018 | Marinier | H04L 1/1819 |
| 2019/0014548 | A1* | 1/2019 | Pelletier | H04W 56/001 |
| 2019/0150143 | A1* | 5/2019 | Yin | H04L 5/0048 370/329 |
| 2019/0380149 | A1* | 12/2019 | Jiang | H04L 5/0053 |
| 2019/0387440 | A1* | 12/2019 | Yiu | H04W 36/165 |
| 2020/0084770 | A1* | 3/2020 | Somichetty | H04L 5/1469 |
| 2020/0154397 | A1* | 5/2020 | Kim | H04W 72/02 |
| 2020/0236524 | A1* | 7/2020 | Ye | H04L 5/0094 |
| 2020/0287690 | A1* | 9/2020 | Zhang | H04L 5/0053 |
| 2020/0305038 | A1* | 9/2020 | Tooher | H04W 36/0085 |
| 2020/0313793 | A1* | 10/2020 | Jung | H04L 5/0094 |
| 2020/0314829 | A1* | 10/2020 | Venugopal | H04W 72/23 |
| 2020/0374959 | A1* | 11/2020 | Park | H04L 5/0094 |
| 2021/0051652 | A1* | 2/2021 | Khoshnevisan | H04L 1/1896 |
| 2021/0051672 | A1* | 2/2021 | Rastegardoost | H04W 74/006 |
| 2021/0250935 | A1* | 8/2021 | Venugopal | H04W 28/06 |
| 2022/0338221 | A1* | 10/2022 | Muruganathan | H04W 72/23 |
| 2023/0090971 | A1* | 3/2023 | Yiu | H04W 36/165 370/331 |

FOREIGN PATENT DOCUMENTS

| | | | | |
|---|---|---|---|---|
| CN | 105453467 | A | 3/2016 | |
| CN | 109923925 | A | 6/2019 | |
| CN | 110266622 | A | 9/2019 | |
| CN | 112532357 | A * | 3/2021 | H04B 7/0617 |
| CN | 112532357 | A | 3/2021 | |
| EP | 2733898 | A2 * | 5/2014 | H04L 1/1861 |
| EP | 2843894 | A1 | 3/2015 | |
| EP | 3042481 | A1 | 7/2016 | |
| EP | 2671422 | B1 * | 6/2020 | H04W 24/10 |
| EP | 3793124 | A1 * | 3/2021 | H04L 5/0007 |
| JP | 6968914 | B2 * | 11/2021 | H04B 7/0486 |
| WO | WO-2004114566 | A1 * | 12/2004 | H04L 25/03834 |
| WO | WO-2013043024 | A1 * | 3/2013 | H04B 7/26 |
| WO | 2017186014 | A1 | 11/2017 | |
| WO | 2018033009 | A1 | 2/2018 | |
| WO | WO-2018124776 | A1 * | 7/2018 | H04W 72/02 |
| WO | WO-2019099565 | A1 * | 5/2019 | H04L 1/1861 |
| WO | WO-2021052165 | A1 * | 3/2021 | H04B 7/0617 |

OTHER PUBLICATIONS

Notification to Grant Patent Right for Invention of Chinses patent application No. CN201910905498.9 dated Sep. 2, 2022.
1st Office Action of Chinese patent application No. 201910905498.9 dated Jan. 29, 2022.
First Search Report of Chinese patent application No. 201910905498.9 dated Jan. 25, 2022.

* cited by examiner when first node does not detect second signaling in first time-frequency-resource-group set

METHOD AND DEVICE IN NODE USED FOR WIRELESS COMMUNICATION

CROSS REFERENCE TO RELATED APPLICATIONS

This application is the continuation of the U.S. patent application Ser. No. 17/955,553, filed on Sep. 29, 2022, which is the continuation of the U.S. patent application Ser. No. 17/011,995, filed on Sep. 3, 2020, which claims the priority benefit of Chinese Patent Application No. 201910905498.9, filed on Sep. 24, 2019. The full disclosure of which is incorporated herein by reference.

BACKGROUND

Technical Field

The present disclosure relates to transmission methods and devices in wireless communication systems, and in particular to a transmission method and device for a radio signal in a wireless communication system supporting a cellular network.

Related Art

In 5G system, in order to support more demanding Ultra Reliable and Low Latency Communication (URLLC) traffic, for example, with higher reliability (e.g., a target BLER of $10^{-6}$) or with lower latency (e.g., 0.5-1 ms), a study item (SI) of URLLC advancement in New Radio (NR) Release 16 was approved at $3^{rd}$ Generation Partner Project (3GPP) Radio Access Network (RAN) #80 Plenary Session. One focus of the study is how to realize lower transmission latency and higher transmission reliability of Physical Uplink Shared CHannel (PUSCH)/Physical Downlink Shared CHannel (PDSCH). In order to support demands of higher reliability and lower latency of URLLC traffic, 3GPP NR Rel-16 system has agreed to adopt a transmission scheme based on nominal repeat transmission in uplink transmissions. When a nominal repeat transmission crosses boundary of a sot or a Downlink/Uplink (DL/UL) switching point, it is divided into two actual repeat transmissions.

SUMMARY

Flexible symbols and dynamic UL/DL configuration have been introduced into 3GPP NR system. So how to design a repeat transmission scheme is a key problem to be solved considering the influence of flexible symbols and dynamic UL/DL configuration.

In view of the above problem, the present disclosure provides a solution. In the description of the above problem, a repeat transmission is illustrated as an example. The present disclosure is also applicable to a single (i.e., non-repetitive) transmission scenario to achieve similar technical effects in a repeat transmission. Besides, a unified solution for different scenarios (including but not limited to repeat transmission scenarios and single transmissions) can also help reduce hardware complexity and cost. It should be noted that the embodiments of a User Equipment (UE) in the present disclosure and the characteristics of the embodiments may be applied to a base station if no conflict is incurred, and vice versa. The embodiments of the present disclosure and the characteristics of the embodiments may be mutually combined if no conflict is incurred.

In one embodiment, terminologies in the present disclosure is interpreted with reference to definition in 3GPP specification protocol TS36 series.

In one embodiment, terminologies in the present disclosure is interpreted with reference to definition of 3GPP specification protocol TS38 series.

In one embodiment, terminologies in the present disclosure is interpreted with reference to definition of 3GPP specification protocol TS37 series.

In one embodiment, terminologies in the present disclosure is interpreted with reference to definition of Institute of Electrical and Electronics Engineers (IEEE) specialization protocol.

The present disclosure provides a method in a first node for wireless communication, comprising:
  receiving first information;
  receiving a first signaling, the first signaling being used for indicating a first symbol set; and
  operating K radio signals respectively in K symbol groups in the first symbol set, K being a positive integer greater than 1;
  wherein the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the operation is transmitting, or, the operation is receiving.

In one embodiment, a problem to be solved in the present disclosure is: how to design a repeat transmission scheme considering the influence of flexible symbols and dynamic UL/DL configuration.

In one embodiment, a problem to be solved in the present disclosure is: how to design transmitting parameters of each repeat transmission in a repeat transmission scheme considering the influence of flexible symbols and dynamic UL/DL configuration.

In one embodiment, the above method is essential in that the operation is transmitting, K radio signals are K repeat transmissions of a PUSCH, a first signaling is a DCI signaling for scheduling a PUSCH, K symbol groups are multicarrier symbols occupied by a PUSCH actual transmission, first information is a semi-statically-configured TDD configuration, a first symbol set is divided into a first symbol subset and a second symbol subset according to TDD configuration, K first-type parameters are respectively transmitting parameters (such as RV, RB occupied, or QCL parameters) of K repeat transmissions. The above method is advantageous in that, considering the influence of flexible symbols and dynamic UL/DL configuration, whether a first node receives a signaling configured by dynamic UL/DL or not, a consistency in understanding of transmitting parameters of K repeat transmissions for a transmitter and a receiver is ensured, thus ensuring the reliability of transmission.

In one embodiment, the above method is essential in that the operation is receiving, K radio signals are K repeat transmissions of a PDSCH, a first signaling is a DCI signaling for scheduling a PDSCH, K symbol groups are multicarrier symbols occupied by a PDSCH actual transmission, first information is a semi-statically-configured TDD configuration, a first symbol set is divided into a first symbol subset and a second symbol subset according to TDD configuration, K first-type parameters are respectively transmitting parameters (such as RV, RB occupied, or QCL parameters) of K repeat transmissions. The above method is advantageous in that, considering the influence of flexible symbols and dynamic UL/DL configuration, whether a first node receives a signaling configured by dynamic UL/DL or not, a consistency in understanding of transmitting parameters of K repeat transmissions for a transmitter and a receiver is ensured, thus ensuring the reliability of transmission.

According to one aspect of the present disclosure, the above method is characterized in that the operation is transmitting, the first symbol subset comprises multicarrier symbol(s) in the first symbol set with the type of UL indicated by the first information, and the second symbol subset comprises multicarrier symbol(s) in the first symbol set with the type of Flexible indicated by the first information; or, the operation is receiving, the first symbol subset comprises multicarrier symbol(s) in the first symbol set with the type of DL indicated by the first information, and the second symbol subset comprises multicarrier symbol(s) in the first symbol set with the type of Flexible indicated by the first information.

In one embodiment, the above method is essential in that the operation is transmitting, a first symbol subset comprises a multicarrier symbol semi-statically configured as UL in a first symbol set, and a second symbol subset comprises a multicarrier symbol semi-statically configured as Flexible in a first symbol set.

In one embodiment, the above method is essential in that the operation is receiving, a first symbol subset comprises a multicarrier symbol semi-statically configured as DL in a first symbol set, and a second symbol subset comprises a multicarrier symbol semi-statically configured as Flexible in a first symbol set.

According to one aspect of the present disclosure, the above method is characterized in that the first signaling is used for determining K0 sequentially-arranged parameters, K0 being a positive integer greater than 1; any of the K first-type parameters is one of the K0 sequentially-arranged parameters; each of K1 symbol group(s) of the K symbol groups belongs to the first symbol subset, K1 radio signal(s) of the K radio signals is(are) respectively transmitted in the K1 symbol group(s), and K1 first-type parameter(s) of the K first-type parameters respectively correspond(s) to the K1 radio signal(s); the K0 sequentially-arranged parameters and relative position(s) of the K1 radio signal(s) are used for determining the K1 first-type parameter(s), one of the K1 first-type parameter(s) corresponding to an earliest one of the K1 radio signal(s) is a first parameter of the K0 sequentially-arranged parameters; K1 is a positive integer not greater than the K.

In one embodiment, the above method is essential in that relative position(s) of the K1 radio signal(s) is(are) respectively 0, 1, ..., K1−1; starting from a first parameter of K0 sequentially-arranged parameters, K1 first-type parameter(s) is(are) respectively determined in order. The above method is advantageous in that whether a first node receives a dynamic UL/DL-configured signaling or not, a consistency in understanding of transmitting parameters of K1 radio signals for a transmitter and a receiver is ensured.

According to one aspect of the present disclosure, the above method is characterized in that the K is greater than 1, the K1 is less than the K, each of K−K1 symbol group(s) of the K symbol groups belongs to the second symbol subset; K−K1 radio signal(s) of the K radio signals is(are) respectively transmitted in the K−K1 symbol group(s), and K−K1 first-type parameter(s) of the K first-type parameters respectively correspond(s) to the K−K1 radio signal(s); the K−K1 first-type parameter(s) is(are) related to one of the K1 first-type parameter(s) corresponding to one of the K1 radio signal(s), or, the K0 sequentially-arranged parameters and relative position(s) of the K−K1 radio signal(s) are used for determining the K−K1 first-type parameter(s), one of the K−K1 first-type parameter(s) corresponding to an earliest one of the K−K1 radio signal(s) is the first parameter of the K0 sequentially-arranged parameters.

According to one aspect of the present disclosure, the above method is characterized in comprising:
receiving second information;
receiving third information; and
monitoring a second signaling in a first time-frequency-resource-group set;
wherein the second information indicates a first identifier, and the second signaling carries the first identifier; the third information is used for indicating the first time-frequency-resource-group set, and the second signaling is a physical-layer signaling; whether the second signaling is detected in the first time-frequency-resource-group set is used for determining the K symbol groups.

In one embodiment, the above method is essential in that a second signaling is a DCI signaling with a dynamically-indicated slot format.

According to one aspect of the present disclosure, the above method is characterized in that when the second signaling is detected in the first time-frequency-resource-group set, the second signaling is used for indicating a first slot format, and the first slot format and the first information are used together for determining the K symbol groups out of the first symbol set.

According to one aspect of the present disclosure, the above method is characterized in that K−K1 symbol group(s) of the K symbol groups belong(s) to the second symbol subset, K1 being a positive integer less than the K; the operation is transmitting, the first slot format is used for indicating that the type of each multicarrier symbol in the K−K1 symbol group(s) is UL, or the first slot format is used for indicating that the type of each multicarrier symbol in the K−K1 symbol group(s) is UL or Flexible; or, the operation is receiving, the first slot format is used for indicating that the type of each multicarrier symbol in the K−K1 symbol group(s) is DL, or the first slot format is used for indicating that the type of each multicarrier symbol in the K−K1 symbol group(s) is DL or Flexible.

The present disclosure provides a method in a second node for wireless communication, comprising:
transmitting first information;
transmitting a first signaling, the first signaling being used for indicating a first symbol set; and
implementing K radio signals respectively in K symbol groups in the first symbol set, K being a positive integer greater than 1;
wherein the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the implementation is receiving, or, the implementation is transmitting.

According to one embodiment of the present disclosure, the above method is characterized in that the implementation is receiving, the first symbol subset comprises multicarrier symbol(s) in the first symbol set with the type of UL indicated by the first information, and the second symbol subset comprises multicarrier symbol(s) in the first symbol set with the type of Flexible indicated by the first information; or, the implementation is transmitting, the first symbol subset comprises multicarrier symbol(s) in the first symbol set with the type of DL indicated by the first information, and the second symbol subset comprises multicarrier symbol(s) in the first symbol set with the type of Flexible indicated by the first information.

According to one aspect of the present disclosure, the above method is characterized in that the first signaling is used for determining K0 sequentially-arranged parameters, K0 being a positive integer greater than 1; any of the K first-type parameters is one of the K0 sequentially-arranged parameters; each of K1 symbol group(s) of the K symbol groups belongs to the first symbol subset, K1 radio signal(s) of the K radio signals is(are) respectively transmitted in the K1 symbol group(s), and K1 first-type parameter(s) of the K first-type parameters respectively correspond(s) to the K1 radio signal(s); the K0 sequentially-arranged parameters and relative position(s) of the K1 radio signal(s) are used for determining the K1 first-type parameter(s), one of the K1 first-type parameter(s) corresponding to an earliest one of the K1 radio signal(s) is a first parameter of the K0 sequentially-arranged parameters; K1 is a positive integer not greater than the K.

According to one aspect of the present disclosure, the above method is characterized in that the K is greater than 1, the K1 is less than the K, each of K−K1 symbol group(s) of the K symbol groups belongs to the second symbol subset; K−K1 radio signal(s) of the K radio signals is(are) respectively transmitted in the K−K1 symbol group(s), and K−K1 first-type parameter(s) of the K first-type parameters respectively correspond(s) to the K−K1 radio signal(s); the K−K1 first-type parameter(s) is(are) related to one of the K1 first-type parameter(s) corresponding to one of the K1 radio signal(s), or, the K0 sequentially-arranged parameters and relative position(s) of the K−K1 radio signal(s) are used for determining the K−K1 first-type parameter(s), one of the K−K1 first-type parameter(s) corresponding to an earliest one of the K−K1 radio signal(s) is the first parameter of the K0 sequentially-arranged parameters.

According to one aspect of the present disclosure, the above method is characterized in comprising:
transmitting second information;
transmitting third information; and
transmitting a second signaling in a first time-frequency-resource-group set;
wherein the second information indicates a first identifier, and the second signaling carries the first identifier; the third information is used for indicating the first time-frequency-resource-group set, and the second signaling is a physical-layer signaling; whether a receiver of the first signaling detects the second signaling in the first time-frequency-resource-group set is used for determining the K symbol groups.

According to one aspect of the present disclosure, the above method is characterized in that when the receiver of the first signaling detects the second signaling in the first time-frequency-resource-group set, the second signaling is used for indicating a first slot format, and the first slot format and the first information are used together for determining the K symbol groups out of the first symbol set.

According to one aspect of the present disclosure, the above method is characterized in that K−K1 symbol group(s) of the K symbol groups belong(s) to the second symbol subset, K1 being a positive integer less than the K; the implementation is receiving, the first slot format is used for indicating that the type of each multicarrier symbol in the K−K1 symbol group(s) is UL, or the first slot format is used for indicating that the type of each multicarrier symbol in the K−K1 symbol group(s) is UL or Flexible; or, the implementation is transmitting, the first slot format is used for indicating that the type of each multicarrier symbol in the K−K1 symbol group(s) is DL, or the first slot format is used for indicating that the type of each multicarrier symbol in the K−K1 symbol group(s) is DL or Flexible.

The present disclosure provides a first node for wireless communication, comprising:
a first receiver, receiving first information; receiving a first signaling, the first signaling being used for indicating a first symbol set; and
a first transceiver, operating K radio signals respectively in K symbol groups in the first symbol set, K being a positive integer greater than 1;
wherein the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the operation is transmitting, or, the operation is receiving.

The present disclosure provides a second node for wireless communication, comprising:
a second transmitter, transmitting first information; transmitting a first signaling, the first signaling being used for indicating a first symbol set; and
a second transceiver, implementing K radio signals respectively in K symbol groups in the first symbol set, K being a positive integer greater than 1;

wherein the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the implementation is receiving, or, the implementation is transmitting.

In one embodiment, the method in the present disclosure is advantageous in the following aspects:

The present disclosure proposes a repeat transmission scheme considering the influence of flexible symbols and dynamic UL/DL configuration.

The present disclosure proposes a scheme about transmitting parameters in each repeat transmission in a repeat transmission scheme considering the influence of flexible symbols and dynamic UL/DL configuration.

The method proposed in the present disclosure, considering the influence of flexible symbols and dynamic UL/DL configuration, whether a first node receives a signaling configured by dynamic UL/DL or not, can ensure a consistency in understanding of transmitting parameters of K repeat transmissions for a transmitter and a receiver, thus ensuring the reliability of transmission.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
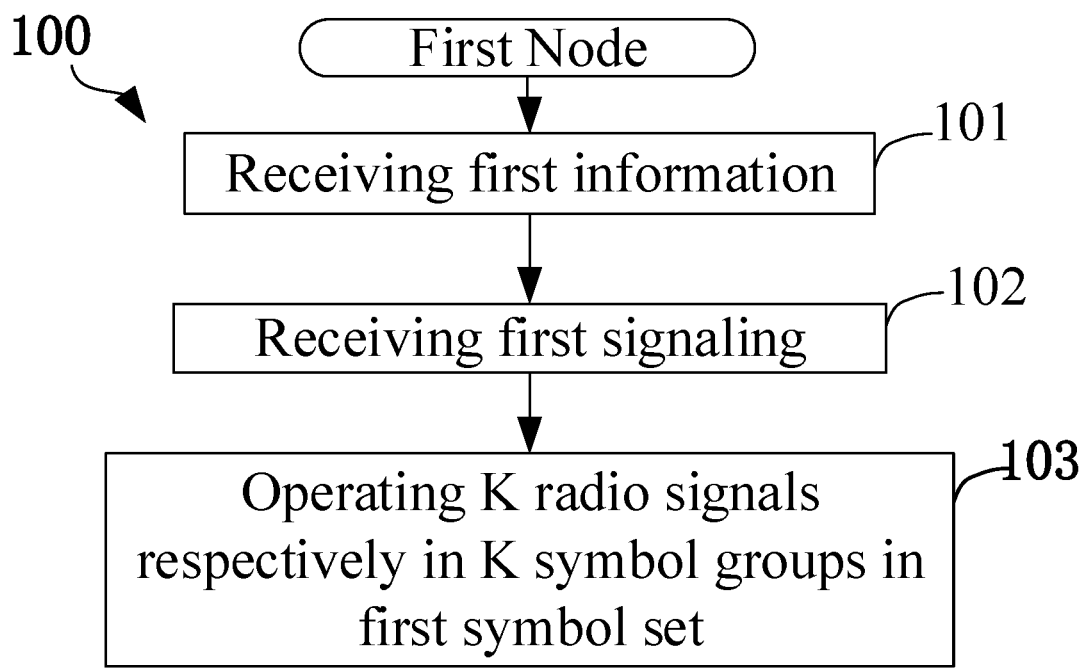
FIG. 1 illustrates a flowchart of first information, a first signaling and K radio signals according to one embodiment of the present disclosure.

Embodiment 1 illustrates a flowchart of first information, a first signaling, and K radio signals according to one embodiment of the present disclosure, as shown in FIG. 1. In FIG. 1, each box represents a step. It should be noted that the order of each box in the diagram does not represent a chronological relationship of steps presented.

In Embodiment 1, the first node in the present disclosure receives first information in step 101; receives a first signaling in step 102, the first signaling being used for indicating a first symbol set; respectively operates K radio signals in K symbol groups in the first symbol set in step 103, K being a positive integer greater than 1; wherein the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the operation is transmitting, or, the operation is receiving.

In one embodiment, the operation is transmitting.

In one embodiment, the operation is receiving.

In one embodiment, the K is greater than 1.

In one embodiment, the K is equal to 1.

In one embodiment, the K is greater than 1, the first node respectively operates K radio signals in K symbol groups in the first symbol set.

In one embodiment, the K is equal to 1, the first node operates K radio signal in K symbol group in the first symbol set.

In one embodiment, the first information is carried by a higher-layer signaling.

In one embodiment, the first information is semi-statically configured.

In one embodiment, the first information is carried by a Radio Resource Control (RRC) signaling.

In one embodiment, the first information is carried by a MAC CE signaling.

In one embodiment, the first information comprises one or more Information Elements (IEs) of an RRC signaling.

In one embodiment, the first information comprises all or part of an IE of an RRC signaling.

In one embodiment, the first information comprises part of fields of an IE in an RRC signaling.

In one embodiment, the first information comprises multiple IEs of an RRC signaling.

In one embodiment, the first information comprises one IE of an RRC signaling.

In one embodiment, the first information comprises tdd-UL-DL-ConfigurationCommon.

In one embodiment, the first information comprises tdd-UL-DL-ConfigurationCommon and tdd-UL-DL-ConfigDedicated.

In one embodiment, the first information comprises part or all of fields of IE TDD-UL-DL-Config.

In one embodiment, the first information comprises part of fields of IE TDD-UL-DL-Config.

In one embodiment, the first information comprises IE TDD-UL-DL-Config.

In one embodiment, the multi-carrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises a Cyclic Prefix (CP).

In one embodiment, types of the multicarrier symbol comprise UL symbol, DL symbol and Flexible symbol.

In one embodiment, the first information explicitly indicates a type of each multicarrier symbol in the first symbol set.

In one embodiment, the first information implicitly indicates a type of each multicarrier symbol in the first symbol set.

In one embodiment, the first information is used for indicating Time Division Duplex (TDD) Configuration, the TDD configuration being used for indicating a type of each multicarrier symbol in the first symbol set.

In one subembodiment of the above embodiment, the first information explicitly indicates TDD configuration.

In one subembodiment of the above embodiment, the first information implicitly indicates TDD configuration.

In one subembodiment of the above embodiment, the TDD configuration explicitly indicates a type of each multicarrier symbol in the first symbol set.

In one subembodiment of the above embodiment, the TDD configuration implicitly indicates a type of each multicarrier symbol in the first symbol set.

In one subembodiment of the above embodiment, the TDD configuration is slot format.

In one subembodiment of the above embodiment, the TDD configuration is semi-statically configured.

In one subembodiment of the above embodiment, the TDD configuration is a configuration for a multicarrier symbol type in TDD system.

In one embodiment, the TDD configuration indicates a type of each multicarrier symbol in a slot configuration period.

In one subembodiment of the above embodiment, a type of each multicarrier symbol in the first symbol set is determined according to a length of the slot configuration period and a type of each multicarrier symbol in a slot configuration period.

In one subembodiment of the above embodiment, the slot configuration period comprises a positive integer number of slot(s).

In one subembodiment of the above embodiment, the slot configuration period comprises a positive integer number of multicarrier symbol(s).

In one subembodiment of the above embodiment, a first multicarrier symbol and a second multicarrier symbol are respectively multicarrier symbols with same positions in two slot configuration periods, and types of the first multicarrier symbol and the second multicarrier symbol are the same.

In one subembodiment of the above embodiment, a first multicarrier symbol and a second multicarrier symbol are respectively i-th multicarrier symbols in two slot configuration periods, types of the first multicarrier symbol and the second multicarrier symbol are the same, i being a positive integer not greater than a number of multicarrier symbol(s) comprised in the slot configuration period.

In one subembodiment of the above embodiment, a type of each multicarrier symbol in each slot is determined according to a length of the slot configuration period and a type of each multicarrier symbol in a slot configuration period.

In one subembodiment of the above embodiment, a type of each multicarrier symbol in the first symbol set is determined according to a type of each multicarrier symbol in the slot configuration period and a position of the first symbol set in the slot configuration period.

In one subembodiment of the above embodiment, a given multicarrier symbol is any multicarrier symbol in the first symbol set, the given multicarrier symbol is j-th multicarrier symbol in the slot configuration period, and a type of the given multicarrier symbol is a type of the j-th multicarrier symbol in the slot configuration period, j being a positive integer not greater than a number of multicarrier symbol(s) comprised in the slot configuration period.

In one subembodiment of the above embodiment, the first information comprises tdd-UL-DL-ConfigurationCommon, the TDD configuration is pattern1, the slot configuration period is P, and the specific meaning of the pattern1 and the P can be found in 3GPP TS38.213, section 11.1.

In one subembodiment of the above embodiment, the first information comprises tdd-UL-DL-ConfigurationCommon and tdd-UL-DL-ConfigDedicated, the TDD configuration comprises pattern1 and pattern2, the slot configuration period is P+P2, and the specific meaning of the pattern1, the pattern2, the P and the P2 can be found in 3GPP TS38.213, section 11.1.

In one subembodiment of the above embodiment, the first information indicates type(s) of part or all of multicarrier symbol(s) in the slot configuration period.

In one subembodiment of the above embodiment, the first information indicates type(s) of all of multicarrier symbol(s) in the slot configuration period.

In one subembodiment of the above embodiment, the first information indicates type(s) of part of multicarrier symbol(s) in the slot configuration period.

In one subembodiment of the above embodiment, the first information indicates type(s) of part of multicarrier symbol(s) in the slot configuration period, and type(s) of other multicarrier symbol(s) in the slot configuration period is(are) predefined.

In one subembodiment of the above embodiment, the first information indicates multicarrier symbols whose types are DL and UL in the slot configuration period.

In one subembodiment of the above embodiment, the first information indicates multicarrier symbols whose types are DL and UL in the slot configuration period, type(s) of multicarrier symbol(s) other than multicarrier symbols indicated by the first information in the slot configuration period is(are) Flexible.

In one subembodiment of the above embodiment, the first information indicates a positive integer number of multicarrier symbol(s) in the slot configuration period, type(s) of multicarrier symbol(s) other than multicarrier symbol(s) indicated by the first information in the slot configuration period is(are) Flexible.

In one subembodiment of the above embodiment, the first information indicates a positive integer number of multicarrier symbol(s) in the slot configuration period, type(s) of multicarrier symbol(s) indicated by the first information is(are) a least one of DL, UL or Flexible, and multicarrier symbol(s) other than multicarrier symbol(s) indicated by the first information in the slot configuration period is(are) Flexible.

In one subembodiment of the above embodiment, the first information indicates a positive integer number of multicarrier symbol(s) in the slot configuration period, types of multicarrier symbols indicated by the first information are a least DL and UL among DL, UL and Flexible, and multicarrier symbol(s) other than multicarrier symbols indicated by the first information in the slot configuration period is(are) Flexible.

In one embodiment, the first signaling is dynamically configured.

In one embodiment, the first signaling is a physical-layer signaling.

In one embodiment, the first signaling is a Downlink Control Information (DCI) signaling.

In one embodiment, the operation is transmitting, the first signaling is a DCI signaling of UpLink Grant, and the operation is transmitting.

In one embodiment, the operation is receiving, the first signaling is a DCI signaling with DownLink Grant, and the operation is receiving.

In one embodiment, the first signaling is transmitted on a downlink physical layer control channel (i.e., a downlink channel that can only be used for bearing a physical-layer signaling).

In one embodiment, the downlink physical-layer control channel is a Physical Downlink Control CHannel (PDCCH).

In one embodiment, the downlink physical-layer control channel is a short PDCCH (sPDCCH).

In one embodiment, the downlink physical-layer control channel is a Narrow Band PDCCH (NB-PDCCH).

In one embodiment, the operation is receiving, the first signaling is DCI format 1_0, and the specific meaning of the DCI format 1_0 can be found in 3GPP TS38.212, section 7.3.1.2.

In one embodiment, the operation is receiving, and the first signaling is DCI format 1_1, and the specific meaning of the DCI format 1_1 can be found in 3GPP TS38.212, section 7.3.1.2.

In one embodiment, the operation is transmitting, the first signaling is DCI format 0_0, and the specific meaning of the DCI format 0_0 can be found in 3GPP TS38.212, section 7.3.1.1.

In one embodiment, the operation is transmitting, the first signaling is DCI format 0_1, and the specific meaning of the DCI format 0_1 can be found in 3GPP TS38.212, section 7.3.1.1.

In one embodiment, the first signaling indicates times of nominal repeat transmissions of the first bit block, and the K is actual repeat-transmission times of the first bit block.

In one embodiment, the first signaling explicitly indicates a first symbol set.

In one embodiment, the first signaling implicitly indicates a first symbol set.

In one embodiment, the first signaling indicates a starting multicarrier symbol of the first symbol set and a number of multicarrier symbols comprised in the first symbol set.

In one embodiment, the first signaling indicates part of multicarrier symbols of the first symbol set and times of nominal repeat transmissions of the first bit block.

In one embodiment, the first signaling indicates multicarrier symbols occupied by a first nominal repeat transmission of the first bit block and times of nominal repeat transmissions of the first bit block.

In one embodiment, the first symbol set comprises N multicarrier symbol group(s), any of the N multicarrier symbol group(s) comprises a positive integer number of multicarrier symbol(s), the N multicarrier symbol group(s) is(are) orthogonal, N being a positive integer; the first signaling indicates an earliest one of the N multicarrier symbol group(s) and the N.

In one subembodiment of the above embodiment, the N multicarrier symbol group(s) is(are) respectively reserved for N nominal repeat transmission(s) of the first bit block, an earliest one of the N multicarrier symbol group(s) is a first nominal repeat transmission of the N nominal repeat transmission(s), the N being time(s) of nominal repeat transmission(s).

In one subembodiment of the above embodiment, the N multicarrier symbol groups are consecutive.

In one subembodiment of the above embodiment, numbers of multicarrier symbols respectively comprised in the N multicarrier symbol groups are the same.

In one subembodiment of the above embodiment, the N is greater than 1, and there exist two adjacent multicarrier symbol groups of the N multicarrier symbol groups being inconsecutive.

In one subembodiment of the above embodiment, the N is greater than 1, there exist two adjacent multicarrier symbol groups of the N multicarrier symbol groups being inconsecutive, and two inconsecutive adjacent multicarrier-symbol groups of the N multicarrier symbol groups comprise at least one multicarrier symbol indicated by the first information that a type is DL.

In one subembodiment of the above embodiment, any of the N multicarrier symbol group(s) comprises a positive integer number of consecutive multicarrier symbols.

In one subembodiment of the above embodiment, a type of any multicarrier symbol in the N multicarrier symbol group(s) is indicated by the first information to be UL, DL or Flexible.

In one subembodiment of the above embodiment, the operation is transmitting, and a type of any multicarrier symbol in the N multicarrier symbol group(s) is indicated by the first information to be UL or Flexible.

In one subembodiment of the above embodiment, the operation is receiving, and a type of any multicarrier symbol in the N multicarrier symbol group(s) is indicated by the first information to be DL or Flexible.

In one subembodiment of the above embodiment, the operation is transmitting, and any of the N multicarrier symbol group(s) does not comprise a multicarrier symbol whose type indicated by the first information to be DL.

In one subembodiment of the above embodiment, the operation is receiving, and any of the N multicarrier symbol group(s) does not comprise a multicarrier symbol whose type indicated by the first information to be UL.

In one subembodiment of the above embodiment, the N is greater than 1.

In one subembodiment of the above embodiment, the N is equal to 1, and an earliest one of the N multicarrier symbol group is the N multicarrier symbol group.

In one subembodiment of the above embodiment, the N is equal to the K.

In one subembodiment of the above embodiment, the N is less than the K.

In one subembodiment of the above embodiment, the N is greater than the K.

In one subembodiment of the above embodiment, the N is greater than 1, and any two of the N multicarrier symbol groups do not comprise a same multicarrier symbol.

In one subembodiment of the above embodiment, any multicarrier symbol in the K symbol groups belongs to the N multicarrier symbol group(s).

In one subembodiment of the above embodiment, any of the K symbol groups belong to only one of the N multicarrier symbol group(s).

In one subembodiment of the above embodiment, one of the N multicarrier symbol group(s) comprises two consecutive symbol groups of the K symbol groups.

In one subembodiment of the above embodiment, any two consecutive symbol groups of the K symbol groups respectively belong to two of the N multicarrier symbol groups.

In one subembodiment of the above embodiment, two of the K symbol groups belonging to a same one of the N multicarrier symbol group(s) are inconsecutive.

In one embodiment, the phrase that two symbol groups are consecutive refers to that a latest multicarrier symbol in an earlier one of the two symbol groups and an earliest multicarrier symbol in a later one of the two symbol groups are consecutive.

In one embodiment, the phrase that two multicarrier symbols are consecutive refers to that the two multicarrier symbols do not comprise a multicarrier symbol.

In one embodiment, the phrase that two multicarrier symbols are consecutive refers to that indexes of the two multicarrier symbols are two consecutive non-negative integers.

In one embodiment, the first signaling also indicates at least one of a Modulation and Coding Scheme (MCS) of K radio signals, configuration information of DeModulation Reference Signals (DMRS), a Hybrid Automatic Repeat reQuest (HARQ) process number, a New Data Indicator (NDI) or a transmitting antenna port.

In one subembodiment of the above embodiment, the configuration information of the DMRS comprises at least one of a Reference Signal (RS) sequence, a mapping mode, a DMRS type, time-domain resources occupied, frequency-domain resources occupied, code-domain resources occupied, cyclic shift, or an Orthogonal Cover Code (OCC).

In one embodiment, multicarrier symbol(s) in the first symbol set belong(s) to a positive integer number of slot(s).

In one embodiment, multicarrier symbol(s) in the first symbol set belong(s) to a positive integer number of subframe(s).

In one embodiment, multicarrier symbol(s) in the first symbol set belong(s) to one slot.

In one embodiment, multicarrier symbol(s) in the first symbol set belong(s) to one subframe.

In one embodiment, multicarrier symbol(s) in the first symbol set belong(s) to multiple slots.

In one embodiment, multicarrier symbol(s) in the first symbol set belong(s) to multiple subframes.

In one embodiment, multicarrier symbols in the first symbol set are consecutive.

In one embodiment, there exist two adjacent multicarrier symbols in the first symbol set being inconsecutive.

In one embodiment, the operation is transmitting, and two inconsecutive adjacent multicarrier symbols in the first symbol set comprise at least one multicarrier symbol whose type indicated by the first information to be DL.

In one embodiment, the operation is receiving, and two inconsecutive adjacent multicarrier symbols in the first symbol set comprise at least one multicarrier symbol whose type indicated by the first information to be UL.

In one embodiment, a type of any multicarrier symbol in the first symbol set is indicated by the first information to be UL, DL or Flexible.

In one embodiment, the operation is transmitting, and a type of any multicarrier symbol in the first symbol set is indicated by the first information to be UL or Flexible.

In one embodiment, the operation is receiving, and a type of any multicarrier symbol in the first symbol set is indicated by the first information to be DL or Flexible.

In one embodiment, the operation is transmitting, and any multicarrier symbol group in the first symbol set does not comprise a multicarrier symbol whose type indicated by the first information to be DL.

In one embodiment, the operation is receiving, and any multicarrier symbol group in the first symbol set does not comprise a multicarrier symbol whose type indicated by the first information to be UL.

In one embodiment, the first symbol set only comprises a first symbol subset and a second symbol subset.

In one embodiment, the first symbol set also comprises at least one multicarrier symbol other than the first symbol subset and the second symbol subset.

In one subembodiment of the above embodiment, the operation is transmitting, and any multicarrier symbol other than the first symbol subset and the second symbol subset in the first symbol set is indicated by the first information that a type is DL.

In one subembodiment, the operation is receiving, and any multicarrier symbol other than the first symbol subset and the second symbol subset in the first symbol set is indicated by the first information that a type is UL.

In one embodiment, the first symbol subset and the second symbol subset are orthogonal.

In one embodiment, any multicarrier symbol in the first symbol subset does not belong to the second symbol subset.

In one embodiment, types of all multicarrier symbols in the first symbol subset indicated by the first information are the same, and types of all multicarrier symbols in the second symbol subset indicated by the first information are the same.

In one embodiment, type(s) of multicarrier symbol(s) in the first symbol subset indicated by the first information and type(s) of multicarrier symbol(s) in the second symbol subset indicated by the first information are different.

In one embodiment, a type of any multicarrier symbol in the first symbol subset indicated by the first information and a type of any multicarrier symbol in the second symbol subset indicated by the first information are different.

In one embodiment, the operation is transmitting, and the first symbol subset and the second symbol subset comprise all multicarrier symbols in the first symbol set indicated by the first information that types are UL or Flexible.

In one embodiment, the operation is receiving, and the first symbol subset and the second symbol subset comprise all multicarrier symbols in the first symbol set indicated by the first information that types are DL or Flexible.

In one embodiment, the operation is transmitting, the first symbol subset and the second symbol subset do not comprise a multicarrier symbol indicated by the first information that a type is DL.

In one embodiment, the operation is receiving, the first symbol subset and the second symbol subset do not comprise a multicarrier symbol indicated by the first information that a type is UL.

In one embodiment, a given symbol group is any of the K symbol groups, types of all multicarrier symbols in the given symbol group indicated by the first information are the same.

In one embodiment, there is no multicarrier symbol belonging to any two of the K symbol groups.

In one embodiment, an end time of one of any two symbol groups in the K symbol groups is earlier than a start time of the other symbol group.

In one embodiment, each of the K symbol groups belongs to the first symbol subset.

In one embodiment, each of K1 symbol group(s) of the K symbol groups belongs to the first symbol subset, and each of K−K1 symbol group(s) other than the K1 symbol group(s) of the K symbol groups belongs to the second symbol subset, K1 being a positive integer less than the K.

In one embodiment, any of the K symbol groups comprises a positive integer number of consecutive multicarrier symbol(s).

In one embodiment, there exist two inconsecutive multicarrier symbols in one of the K symbol groups.

In one embodiment, the type of each multicarrier symbol in the first symbol set indicated by the first information is used for determining the first symbol subset and the second symbol subset.

In one embodiment, the first symbol subset comprises multicarrier symbols with same types in the first symbol set indicated by the first information, the second symbol subset comprises multicarrier symbols with same types in the first symbol set indicated by the first information, and types of multicarrier symbols in the first symbol subset indicated by the first information and types of multicarrier symbols in the second symbol subset indicated by the first information are different.

In one embodiment, types of multicarrier symbols in the first symbol subset indicated by the first information and types of multicarrier symbols in the second symbol subset indicated by the first information are different.

In one embodiment, a type of any multicarrier symbol in the first symbol subset indicated by the first information and a type of any multicarrier symbol in the second symbol subset indicated by the first information are different.

In one embodiment, the operation is transmitting, and the first symbol subset and the second symbol subset comprises all multicarrier symbols in the first symbol set indicated by the first information that types are UL or Flexible.

In one embodiment, the operation is receiving, and the first symbol subset and the second symbol subset comprises all multicarrier symbols in the first symbol set indicated by the first information that types are DL or Flexible.

In one embodiment, the operation is transmitting, and the first symbol subset and the second symbol subset do not comprise a multicarrier symbol indicated by the first information that a type is DL.

In one embodiment, the operation is receiving, and the first symbol subset and the second symbol subset do not comprise a multicarrier symbol indicated by the first information that a type is UL.

In one embodiment, the K radio signals are respectively K repeat transmissions of the first bit block.

In one embodiment, the first bit block is transmitted in only the K symbol groups in the first symbol set.

In one embodiment, the first bit block is also transmitted in a multicarrier other than the K symbols in the first symbol set.

In one embodiment, the first bit block is also transmitted in a symbol group other than the K symbols in the first symbol set.

In one embodiment, the first bit block comprises a transport block (TB).

In one embodiment, the first bit block comprises a positive integer number of TB(s).

In one embodiment, the K radio signals are respectively K repeat transmissions of the first bit block.

In one subembodiment, a given radio signal is any of the K radio signals, and the given radio signal is obtained by the first bit block sequentially subjected to CRC Insertion, Channel Coding, Rate Matching, Scrambling, Modulation, Layer Mapping, Precoding, Mapping to Resource Element, OFDM Baseband Signal Generation, and Modulation and Upconversion.

In one embodiment, a given radio signal is any of the K radio signals, and the given radio signal is obtained by the first bit block sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation and Modulation and Upconversion.

In one embodiment, a given radio signal is any of the K radio signals, and the given radio signal is obtained by the first bit block sequentially subjected to CRC Insertion, Segmentation, CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

In one embodiment, there exist two radio signals of the K radio signals belonging to a same slot.

In one embodiment, there exist two of the K radio signals with different positions in their respective slots.

In one embodiment, there exist two of the K radio signals with different Redundancy Versions (RV).

In one embodiment, the K radio signals correspond to a same HARQ Process Number.

In one embodiment, the first-type parameter comprises a RV value, and the K first-type parameters are respectively RV values of the K radio signals.

In one embodiment, the first-type parameter comprises frequency-domain resources, and the K first-type parameters are respectively frequency-domain resources occupied by the K radio signals.

In one embodiment, the first-type parameter comprises a Quasi Co-Located (QCL) parameter, and the K first-type parameters are respectively QCL parameters of K radio signals.

In one embodiment, a type of the QCL parameter is Type D.

In one embodiment, the operation is receiving, and the QCL parameters is a Spatial Rx parameter.

In one embodiment, the operation is receiving, and the QCL parameter is a receiving beam.

In one embodiment, the operation is receiving, and the QCL parameter is a receiving beamforming matrix.

In one embodiment, the operation is receiving, and the QCL parameter is a receiving analog beamforming matrix.

In one embodiment, the operation is receiving, and the QCL parameter is a receiving analog beamforming vector.

In one embodiment, the operation is receiving, and the QCL parameter is a receiving beamforming vector.

In one embodiment, the operation is receiving, and the QCL parameter is receiving spatial filtering.

In one embodiment, the operation is transmitting, and the QCL parameter is a Spatial Tx parameter.

In one embodiment, the operation is transmitting, and the QCL parameter is a transmitting beam.

In one embodiment, the operation is transmitting, and the QCL parameter is a transmitting beamforming matrix.

In one embodiment, the operation is transmitting, and the QCL parameter is a transmitting analog beamforming matrix.

In one embodiment, the operation is transmitting, and the QCL parameter is a transmitting analog beamforming vector.

In one embodiment, the operation is transmitting, and the QCL parameter is a transmitting beamforming vector.

In one embodiment, the operation is transmitting, and the QCL parameter is transmitting spatial filtering.

In one embodiment, the Spatial Tx parameter include one or more of a transmitting antenna port, a transmitting antenna port group, a transmitting beam, a transmitting analog beamforming matrix, a transmitting analog beamforming vector, a transmitting beamforming matrix, a transmitting beamforming vector and transmitting spatial filtering.

In one embodiment, the Spatial Rx parameter includes one or more of a receiving beam, a receiving analog beamforming matrix, a receiving analog beamforming vector, a receiving beamforming matrix, a receiving beamforming vector and receiving spatial filtering.

In one embodiment, the K first-type parameters are related to symbol group(s) of the K symbol groups belonging to the first symbol subset.

In one embodiment, the K first-type parameters are related to a number of symbol group(s) of the K symbol groups belonging to the first symbol subset.

In one embodiment, the K first-type parameters are related to position(s) of symbol group(s) of the K symbol groups belonging to the first symbol subset.

In one embodiment, the K first-type parameters are related to symbol groups of the K symbol groups respectively belonging to the first symbol subset and the second symbol subset.

In one embodiment, the K first-type parameters are related to a number of symbol groups of the K symbol groups respectively belonging to the first symbol subset and the second symbol subset.

In one embodiment, the K first-type parameters are related to positions of symbol groups of the K symbol groups respectively belonging to the first symbol subset and the second symbol subset.

In one embodiment, the first signaling is used for determining K0 sequentially-arranged parameters, K0 being a positive integer greater than 1; the K first-type parameters are related to the K0 sequentially-arranged parameters and symbol subsets to which the K symbol groups belong.

In one subembodiment of the above embodiment, the K first-type parameters are related to the K0 sequentially-arranged parameters and symbol group(s) of the K symbol groups belonging to the first symbol subset.

In one subembodiment of the above embodiment, the K first-type parameters are related to K0 sequentially-arranged parameters and a number of symbol group(s) of the K symbol groups belonging to the first symbol subset.

In one subembodiment of the above embodiment, the K first-type parameters are related to the K0 sequentially-arranged parameters and position(s) of symbol group(s) of the K symbol groups belonging to the first symbol subset.

In one subembodiment of the above embodiment, the K first-type parameters are related to the K0 sequentially-arranged parameters and symbol groups of the K symbol groups respectively belonging to the first symbol subset and the second symbol subset.

In one subembodiment of the above embodiment, the K first-type parameters are related to the K0 sequentially-arranged parameters and a number of symbol groups of the K symbol groups respectively belonging to the first symbol subset and the second symbol subset.

In one subembodiment of the above embodiment, the K first-type parameters are related to the K0 sequentially-arranged parameters and positions of symbol groups of the K symbol groups respectively belonging to the first symbol subset and the second symbol subset.

Embodiment 2

Figure 2:
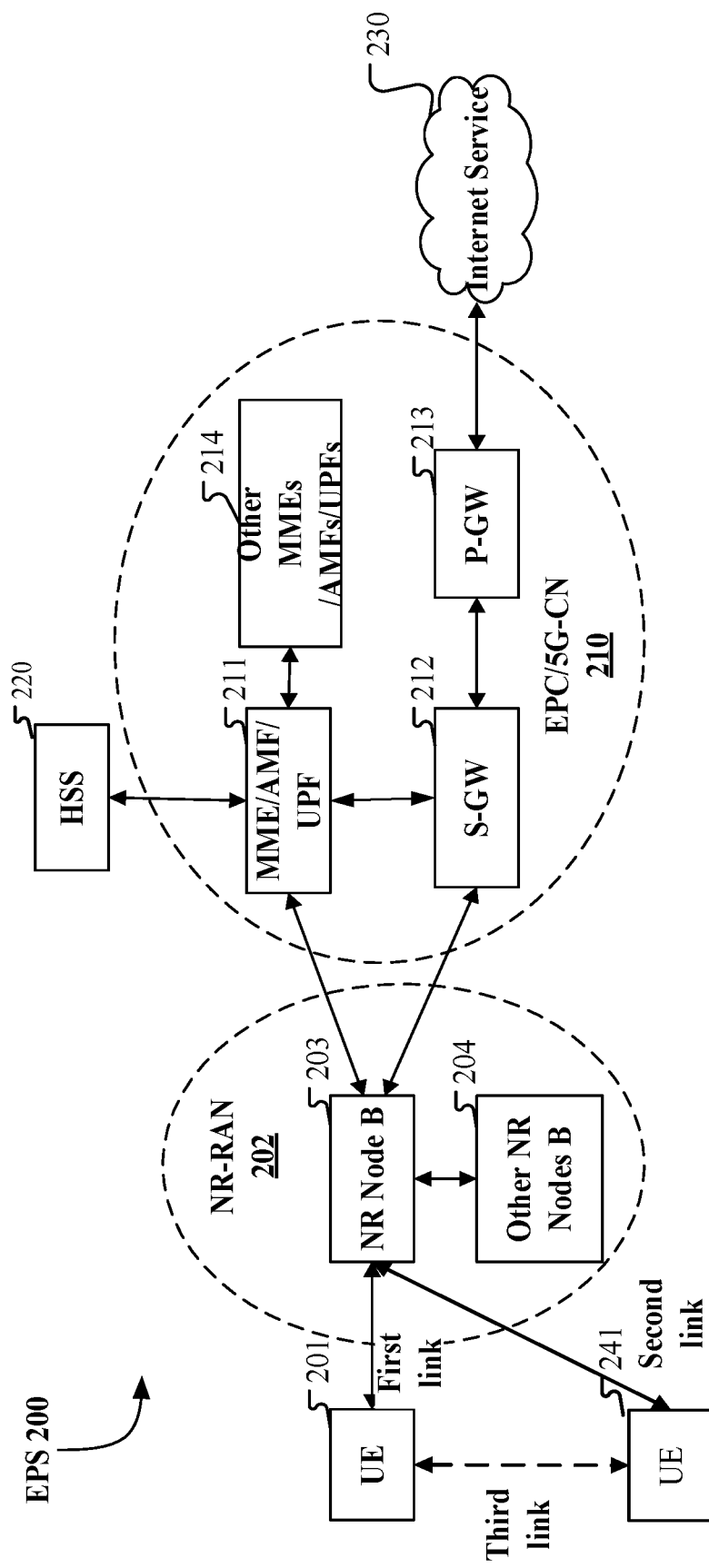
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or some other applicable terms. The EPS 200 may comprise one or more UEs 201, a NG-RAN 202, an Evolved Packet Core/5G-Core Network (EPC/5G-CN) 210, a Home Subscriber Server (HSS) 220 and an Internet Service 230.

The EPS may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN comprises an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, the gNB 203 corresponds to the second node in the present disclosure.

Embodiment 3

Figure 3:
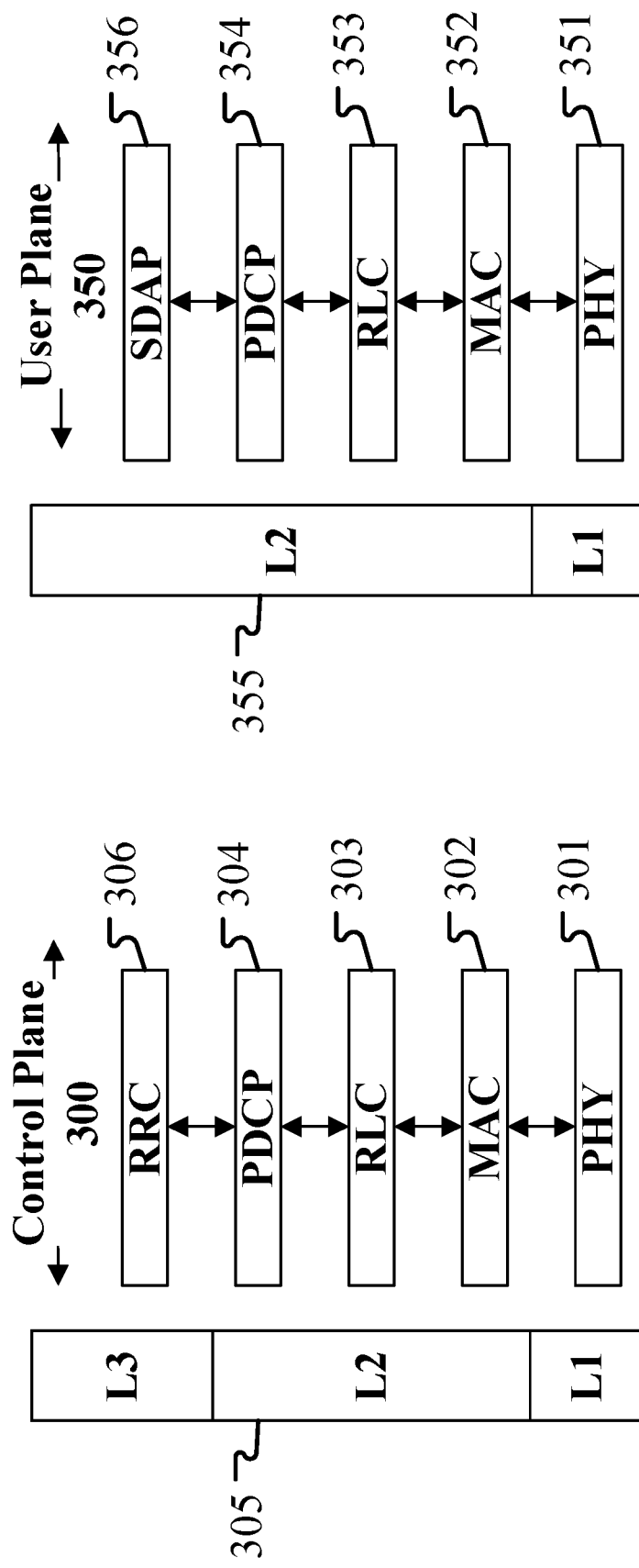
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3(L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC sublayer 306.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the MAC sublayer 302.

In one embodiment, the third information in the present disclosure is generated by the RRC sublayer 306.

In one embodiment, the third information in the present disclosure is generated by the MAC sublayer 302.

In one embodiment, the first signaling in the present disclosure is generated by the PHY 301.

In one embodiment, the second signaling in the present disclosure is generated by the PHY 301.

In one embodiment, the K radio signals in the present disclosure are generated by the PHY 301.

Embodiment 4

Figure 4:
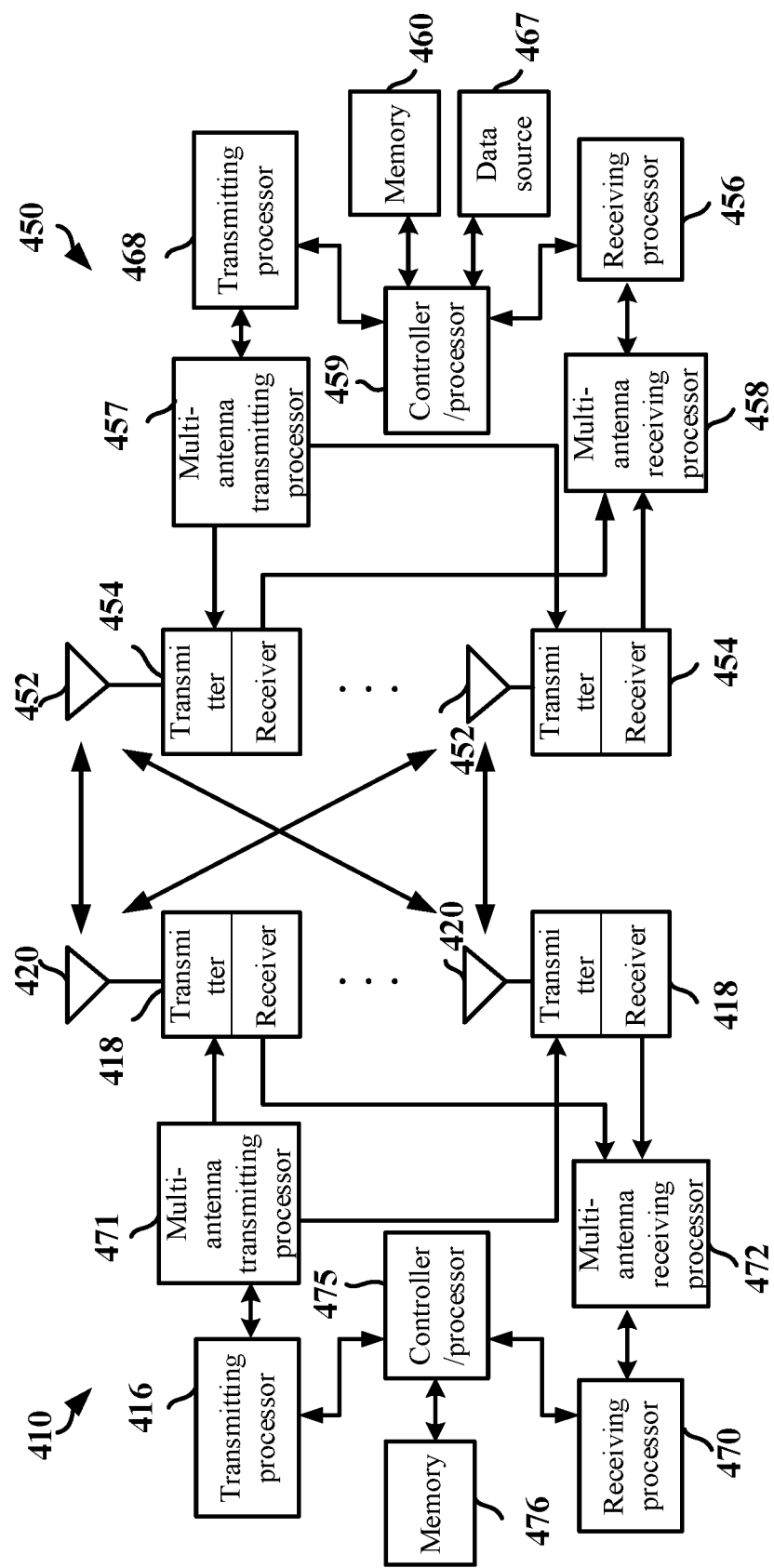
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 410 and a second communication device 450 that are in communication with each other in access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In the transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In the transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In the transmission from the second communication device to the first communication device, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second communication device 450 comprises at least one controller/processor; the at least one controller/processor is responsible for HARQ operation.

In one subembodiment of the above embodiment, the first communication device 410 comprises at least one controller/processor; the at least one controller/processor is responsible for HARQ operation.

In one subembodiment of the above embodiment, the first communication device 410 comprises at least one controller/processor; the at least one controller/processor is responsible for error detection using ACK and/or NACK protocols as a way to support HARQ operation.

In one embodiment, the second communication device 450 comprises at least one processor and at least one memory. The at least one memory includes computer program codes. The at least one memory and the computer program codes are configured to be used in collaboration with the at least one processor. The second communication device 450 at least receives first information; receives a first signaling, the first signaling being used for indicating a first symbol set; and operates K radio signals respectively in K symbol groups in the first symbol set, K being a positive integer greater than 1; wherein the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the operation is transmitting, or, the operation is receiving.

In one subembodiment of the above embodiment, the second communication device 450 corresponds to the first node in the present disclosure.

In one embodiment, the second communication device 450 comprises a memory that stores a computer readable instruction program. The computer readable instruction program generates an action when executed by at least one processor. The action includes receiving first information; receiving a first signaling, the first signaling being used for indicating a first symbol set; and operating K radio signals respectively in K symbol groups in the first symbol set, K being a positive integer greater than 1; wherein the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the operation is transmitting, or, the operation is receiving.

In one subembodiment of the above embodiment, the second communication device 450 corresponds to the first node in the present disclosure.

In one embodiment, the first communication device 410 comprises at least one processor and at least one memory, and the at least one memory includes computer program codes; the at least one memory and the computer program codes are configured to be used in collaboration with the at least one processor. The first communication device 410 at least: transmits first information; transmits a first signaling, the first signaling is used for indicating a first symbol set; and implements K radio signals respectively in K symbol groups in the first symbol set, K being a positive integer greater than 1; wherein the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the implementation is receiving, or, the implementation is transmitting.

In one subembodiment of the above embodiment, the first communication device 410 corresponds to the second node in the present disclosure.

In one embodiment, the first communication device 410 comprises a memory that stores a computer readable instruction program. The computer readable instruction program generates an action when executed by at least one processor. The action includes transmitting first information; transmitting a first signaling, the first signaling being used for indicating a first symbol set; and implementing K radio signals respectively in K symbol groups in the first symbol set, K being a positive integer greater than 1; wherein the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the implementation is receiving, or, the implementation is transmitting.

In one subembodiment of the above embodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used to receive the first information in the present disclosure.

In one embodiment, at least one of the antenna 420, the transmitter 418, the multi-antenna transmitting processor 471, the transmitting processor 416, the controller/processor 475, or the memory 476 is used to transmit the first information in the present disclosure.

In one embodiment, at least one of the antenna 452, the receiver 454, the multi-antenna receiving processor 458, the receiving processor 456, the controller/processor 459, the memory 460, or the data source 467 is used to receive the second information in the present disclosure.

In one embodiment, at least one of the antenna 420, the transmitter 418, the multi-antenna transmitting processor 471, the transmitting processor 416, the controller/processor 475, or the memory 476 is used to transmit the second information in the present disclosure.

In one embodiment, at least one of the antenna 452, the receiver 454, the multi-antenna receiving processor 458, the receiving processor 456, the controller/processor 459, the memory 460, or the data source 467 is used to receive the third information in the present disclosure.

In one embodiment, at least one of the antenna 420, the transmitter 418, the multi-antenna transmitting processor 471, the transmitting processor 416, the controller/processor 475, or the memory 476 is used to transmit the third information in the present disclosure.

In one embodiment, at least one of the antenna 452, the receiver 454, the multi-antenna receiving processor 458, the receiving processor 456, the controller/processor 459, the memory 460, or the data source 467 is used to monitor the second signaling in the first time-frequency-resource group set in the present disclosure.

In one embodiment, at least one of the antenna 452, the receiver 454, the multi-antenna receiving processor 458, the receiving processor 456, the controller/processor 459, the memory 460, or the data source 467 is used to receive the first signaling in the present disclosure.

In one embodiment, at least one of the antenna 420, the transmitter 418, the multi-antenna transmitting processor 471, the transmitting processor 416, the controller/processor 475, or the memory 476 is used to transmit the first signaling in the present disclosure.

In one embodiment, the operation in the present disclosure is receiving, and at least one of the antenna 452, the receiver 454, the multi-antenna receiving processor 458, the receiving processor 456, the controller/processor 459, the memory 460, or the data source 467 is used to receive the K radio signals in the present disclosure respectively in the K symbol groups in the first symbol set in the present disclosure.

In one embodiment, the implementation in the present disclosure is transmitting, and at least one of the antenna 420, the transmitter 418, the multi-antenna transmitting processor 471, the transmitting processor 416, the controller/processor 475, or the memory 476 is used to transmit the K radio signals in the present disclosure respectively in the K symbol groups in the first symbol set in the present disclosure.

In one embodiment, the operation in the present disclosure is transmitting, and at least one of the antenna 452, the transmitter 454, the multi-antenna transmitting processor 458, the transmitting processor 468, the controller/processor 459, the memory 460, or the data source 467 is used to transmit the K radio signals in the present disclosure respectively in the K symbol groups in the first symbol set in the present disclosure.

In one embodiment, the implementation in the present disclosure is receiving, and at least one of the antenna 420, the receiver 418, the multi-antenna receiving processor 472, the receiving processor 470, the controller/processor 475, or the memory 476 is used to receive the K radio signals in the present disclosure respectively in the K symbol groups in the first symbol set in the present disclosure.

In one embodiment, at least one of the antenna 452, the transmitter/receiver 454, the multi-antenna transmitting processor 458, the multi-antenna receiving processor 458, the transmitting processor 468, the receiving processor 456, the controller/processor 459, the memory 460, or the data source 467 is used to operate the K radio signals in the present disclosure respectively in the K symbol groups in the first symbol set in the present disclosure.

In one embodiment, at least one of the antenna 420, the transmitter/receiver 418, the multi-antenna transmitting processor 471, the multi-antenna receiving processor 472, the transmitting processor 416, the receiving processor 470, the controller/processor 475, or the memory 476 is used to implement the K radio signals in the present disclosure respectively in the K symbol groups in the first symbol set in the present disclosure.

Embodiment 5

Figure 5:
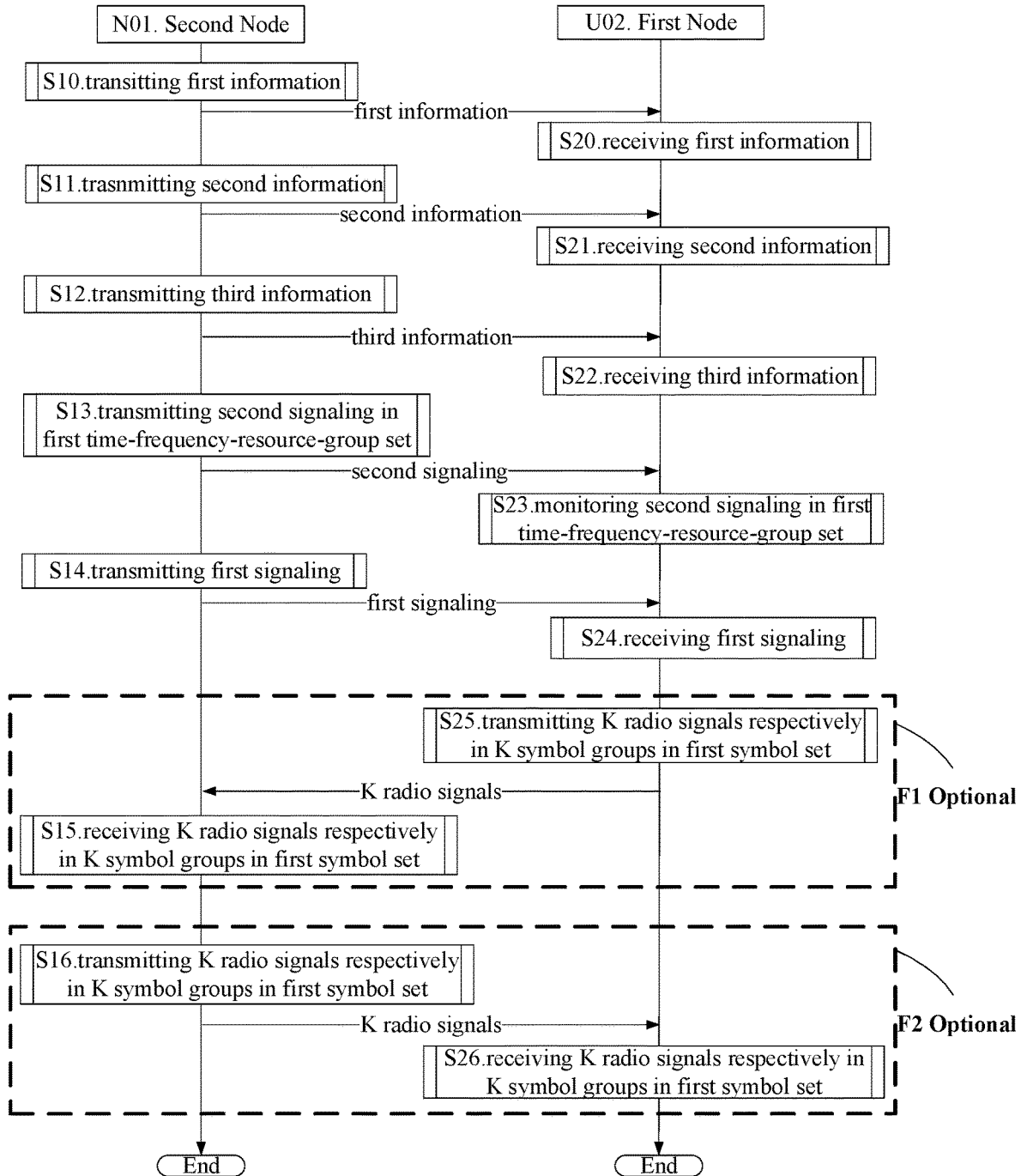
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. In FIG. 5, a first node U02 and a second node N01 communicate through an air interface. In FIG. 5, there exists one and only one between the dotted box F1 and F2.

For first node U02 receives first information in step S20; receives second information in step S21; receives third information in step S22; monitors a second signaling in a first time-frequency-resource-group set in step S23; receives a first signaling in step S24; transmits K radio signals respectively in K symbol groups in a first symbol set in step S25; and receives K radio signals respectively in K symbol groups in a first symbol set in step S26.

For second node N01 transmits first information in step S10; transmits second information in step S11; transmits third information in step S12; transmits a second signaling in a first time-frequency-resource-group set in step S13; transmits a first signaling in step S14; receives K radio signals respectively in K symbol groups in a first symbol set in step S15; and transmits K radio signals respectively in K symbol groups in a first symbol set in step S16.

In Embodiment 5, the first signaling is used for indicating a first symbol set; K is a positive integer; the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong. The second information indicates a first identifier, and the second signaling carries the first identifier; the third information is used for indicating the first time-frequency-resource-group set, and the second signaling is a physical-layer signaling; whether the second signaling is detected in the first time-frequency-resource-group set is used for determining the K symbol groups.

In one embodiment, the operation in the present disclosure is transmitting, and the implementation in the present disclosure is receiving; the dotted box F1 exists, and the dotted box F2 does not exist.

In one embodiment, the operation in the present disclosure is receiving, and the implementation in the present disclosure is transmitting; the dotted box F1 does not exist, and the dotted box F2 exists.

In one embodiment, the second information is used for configuring that the first node monitors the second signaling.

In one embodiment, the second information is semi-statically configured.

In one embodiment, the second information is carried by an RRC signaling.

In one embodiment, the second information is carried by a MAC CE signaling.

In one embodiment, the second information comprises one or more IEs of an RRC signaling.

In one embodiment, the second information comprises all or part of an IE of an RRC signaling.

In one embodiment, the second information comprises an SFI-RNTI field in IE SlotFormatIndicator of an RRC signaling, and the specific meaning of the IE SlotFormatIndicator and the SFI-RNTI field can be found in 3GPP TS38.331, section 6.3.2.

In one embodiment, the first identifier is SFI-RNTI.

In one embodiment, the first identifier is a non-negative integer.

In one embodiment, the second signaling is dynamically configured.

In one embodiment, the second signaling is a physical-layer signaling.

In one embodiment, the second signaling is a DCI signaling.

In one embodiment, the second signaling is transmitted on a downlink physical-layer control channel (i.e., a downlink channel that can only be used for bearing a physical-layer signaling).

In one embodiment, the second signaling indicates a slot format.

In one embodiment, the second signaling is DCI format 20, the specific meaning of the DCI format 2_0 can be found in 3GPP TS38.212, section 7.3.1.3.

In one embodiment, the first node is configured to monitor the second signaling.

In one embodiment, the first identifier is a signaling identifier of the second signaling.

In one embodiment, the second signaling is a DCI signaling identified by the first identifier.

In one embodiment, the first identifier is used for generating a Reference Signal (RS) sequence of DeModulation Reference Signals (DMRS) of the second signaling.

In one embodiment, a Cyclic Redundancy Check (CRC) bit sequence of the second signaling is scrambled by the first identifier.

In one embodiment, the monitoring refers to a blind detection, that is, a signal is received in a given time-frequency-resource group and a decoding operation is implemented, when the decoding is determined to be correct according to a CRC bit, it is judged that a given radio signal is received; otherwise it is judged that a given radio signal is not received.

In one subembodiment of the above embodiment, the given time-frequency-resource group belongs to the first time-frequency-resource-group set, and the given radio signal is the second signaling.

In one embodiment, the monitoring refers to a coherent detection, that is, an RS sequence of DMRS of a physical-layer channel where a given radio signal is located is used for performing a coherent reception in a given time-frequency-resource group, and energy of a radio signal obtained after the coherent reception is measured. When energy of a radio signal obtained after the coherent reception is greater than a first given threshold, it is judged that the given radio signal is received; otherwise it is judged that the given radio signal is not received.

In one subembodiment of the above embodiment, the given time-frequency-resource group belongs to the first time-frequency-resource-group set, and the given radio signal is the second signaling.

In one embodiment, the monitoring refers to an energy detection, that is, energy of a radio signal is sensed in a given time-frequency-resource group and is averaged in time to obtain received energy. When the received energy is greater than a second given threshold, it is judged that a given radio signal is received; otherwise it is judged that a given radio signal is not received.

In one subembodiment of the above embodiment, the given time-frequency-resource group belongs to the first time-frequency-resource-group set, and the given radio signal is the second signaling.

In one embodiment, the monitoring refers to a coherent detection, that is, a sequence of a given radio signal is used for performing a coherent reception in a given time-frequency-resource group, and energy of a radio signal obtained after the coherent reception is measured. When energy of a radio signal obtained after the coherent reception is greater than a third given threshold, it is judged that the given radio signal is received; otherwise it is judged that the given radio signal is not received.

In one subembodiment of the above embodiment, the given time-frequency-resource group belongs to the first time-frequency-resource-group set, and the given radio signal is the second signaling.

In one embodiment, the monitoring refers to a blind detection, that is, a signal is received in a given time-frequency-resource group and a decoding operation is implemented, when the decoding is determined to be correct according to a CRC bit, it is judged that a given radio signal is detected; otherwise it is judged that a given radio signal is not detected.

In one subembodiment of the above embodiment, the given time-frequency-resource group belongs to the first time-frequency-resource-group set, and the given radio signal is the second signaling.

In one embodiment, the monitoring refers to a coherent detection, that is, an RS sequence of DMRS of a physical layer channel where a given radio signal is located is used for performing a coherent reception in a given time-frequency-resource group, and energy of a radio signal obtained after the coherent reception is measured. When energy of a radio signal obtained after the coherent reception is greater than a first given threshold, it is judged that the given radio signal is detected; otherwise it is judged that the given radio signal is not detected.

In one subembodiment of the above embodiment, the given time-frequency-resource group belongs to the first time-frequency-resource-group set, and the given radio signal is the second signaling.

In one embodiment, the monitoring refers to an energy detection, that is, energy of a radio signal is sensed in a given time-frequency-resource group and is averaged in time to obtain received energy. When the received energy is greater than a second given threshold, it is judged that a given radio signal is detected; otherwise it is judged that a given radio signal is not detected.

In one subembodiment of the above embodiment, the given radio signal is the second signaling.

In one embodiment, the monitoring refers to a coherent detection, that is, a sequence of a given radio signal is used for performing a coherent reception in a given time-frequency-resource group, and energy of a radio signal obtained after the coherent reception is measured. When energy of a radio signal obtained after the coherent reception is greater than a third given threshold, it is judged that the given radio signal is detected; otherwise it is judged that the given radio signal is not detected.

In one subembodiment of the above embodiment, the given time-frequency-resource group belongs to the first time-frequency-resource-group set, and the given radio signal is the second signaling.

In one embodiment, the third information explicitly indicates the first time-frequency-resource-group set.

In one embodiment, the third information implicitly indicates the first time-frequency-resource-group set.

In one embodiment, the first time-frequency-resource-group set comprises a positive integer number of time-frequency-resource group(s).

In one subembodiment of the above embodiment, the time-frequency resource group comprises a positive integer number of REs.

In one subembodiment of the above embodiment, the time-frequency-resource group belongs to a slot in time domain.

In one subembodiment of the above embodiment, the time-frequency-resource group belongs to a subframe in time domain.

In one subembodiment of the above embodiment, the time-frequency-resource group comprises a search space.

In one subembodiment of the above embodiment, the time-frequency-resource group comprises a ControlResourceSet (CORESET).

In one subembodiment of the above embodiment, the time-frequency-resource group comprises a PDCCH candidate.

In one embodiment, the first time-frequency-resource-group set comprises a positive integer number of REs.

In one embodiment, the first time-frequency-resource-group set comprises part of REs in a positive integer number of slot(s).

In one embodiment, the first time-frequency-resource-group set comprises part of REs in a slot.

In one embodiment, the third information is semi-statically configured.

In one embodiment, the third information is carried by an RRC signaling.

In one embodiment, the third information is carried by a MAC CE signaling.

In one embodiment, the third information comprises one or more IEs of an RRC signaling.

In one embodiment, the third information comprises all or part of an IE of an RRC signaling.

In one embodiment, the third information comprises part of fields of an IE in an RRC signaling.

In one embodiment, the third information comprises multiple IEs of an RRC signaling.

In one embodiment, the third information comprises one IE of an RRC signaling.

In one embodiment, the third information comprises part or all of fields of an IE.

In one embodiment, the third information comprises part fields of an IE.

In one embodiment, the third information comprises part or all of fields of IE PDCCH-ConfigSIB1, and the specific meaning of the IE PDCCH-ConfigSIB1 can be found in 3GPP TS38.331, section 6.3.2.

In one embodiment, the third information comprises part or all of fields of IE PDCCH-ConfigCommon, and the specific meaning of the IE PDCCH-ConfigCommon can be found in 3GPP TS38.331, section 6.3.2.

In one embodiment, the third information comprises part or all of fields of IE PDCCH-Config, and the specific meaning of the IE PDCCH-Config can be found in 3GPP TS38.331, section 6.3.2.

In one embodiment, the third information comprises IE ControlResourceSet, and the specific meaning of the IE ControlResourceSet can be found in 3GPP TS38.331, section 6.3.2.

In one embodiment, the third information comprises IE PDCCH-Config and IE ControlResourceSet.

Embodiment 6

Figure 6:
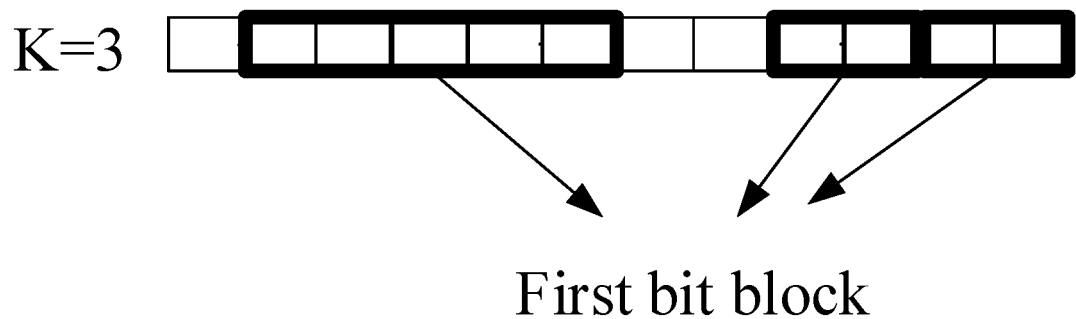
FIG. 6 illustrate a schematic diagram of a relationship between a first symbol set and a first bit block according to one embodiment of the present disclosure.

Embodiment 6 illustrate a schematic diagram of a relationship between a first symbol set and a first bit block according to one embodiment of the present disclosure, as shown in FIG. 6.

In Embodiment 6, the first bit block is transmitted in only the K symbol groups in the present disclosure in the first symbol set.

In one embodiment, there exist two consecutive symbol groups of the K symbol groups respectively belonging to the first symbol subset and the second symbol subset.

In one embodiment, a first given group and a second given group are respectively two consecutive symbol groups of the K symbols groups belonging to a same multicarrier symbol group of the N multicarrier symbol group(s), and the first given group and the second given group respectively belong to the first symbol subset and the second symbol subset.

Embodiment 7

Figure 7:
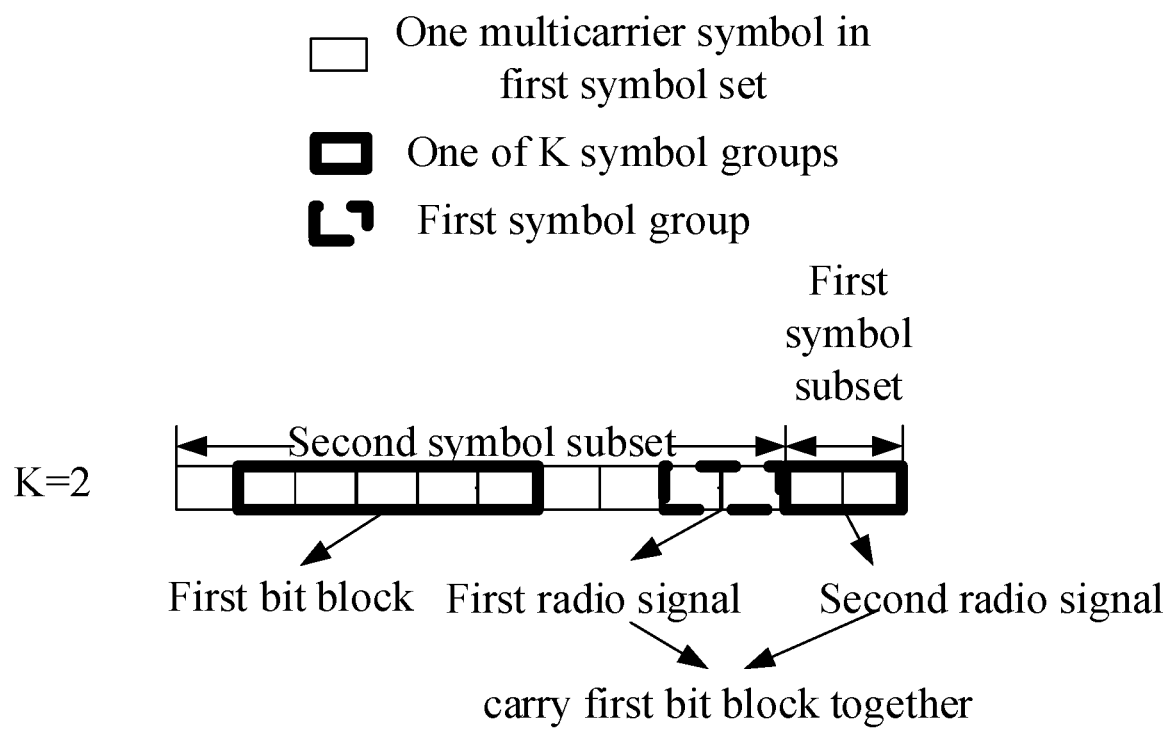
FIG. 7 illustrate a schematic diagram of a relationship between a first symbol set and a first bit block according to another embodiment of the present disclosure.

Embodiment 7 illustrate a schematic diagram of a relationship between a first symbol set and a first bit block according to another embodiment of the present disclosure, as shown in FIG. 7.

In Embodiment 7, the first node in the present disclosure also transmits a first radio signal in a first symbol group, the first symbol group in the present disclosure comprises a positive integer number of multicarrier symbol(s) other than the K symbol groups in the present disclosure in the first symbol set, the first symbol group set belongs to the second symbol subset in the present disclosure, the second radio signal is one of the K radio signals in the present disclosure, and the first radio signal and the second radio signal carry the first bit block together.

In one embodiment, a second symbol group is one of the K symbol groups for transmitting the second radio signal, the second symbol group belongs to the first symbol subset, and the first symbol group and the second symbol group are consecutive.

In one subembodiment of the above embodiment, a start time of the first symbol subset is later than an end time of the second symbol subset, and the second symbol group is an earliest one of the K symbol groups belonging to the first symbol subset.

In one subembodiment of the above embodiment, an end time of the first symbol subset is earlier than a start time of the second symbol subset, and the second symbol group is a latest one of the K symbol groups belonging to the first symbol subset.

In one embodiment, a reference radio signal comprises the first radio signal and the second radio signal, and the reference radio signal is one repeat transmission of the first bit block.

In one embodiment, a reference radio signal comprises the first radio signal and the second radio signal, and the reference radio signal is obtained by the first bit block sequentially subjected to CRC Insertion, Channel Coding, Rate Matching, Scrambling, Modulation, Layer Mapping, Precoding, Mapping to Resource Element, OFDM Baseband Signal Generation, and Modulation and Upconversion.

In one embodiment, a reference radio signal comprises the first radio signal and the second radio signal, and the reference radio signal is obtained by the first bit block sequentially subjected to CRC Insertion, Channel Coding, Rate Matching, Scrambling, Modulation, Layer Mapping, Precoding, Mapping to Virtual Resource Blocks, Mapping from Virtual to Physical Resource Blocks, OFDM Baseband Signal Generation and Modulation and Upconversion.

In one embodiment, a reference radio signal comprises the first radio signal and the second radio signal, and the reference radio signal is obtained by the first bit block sequentially subjected to CRC Insertion, Segmentation, CRC Insertion, Channel Coding, Rate Matching, Concatenation, Scrambling, Modulation, Layer Mapping, Precoding, Mapping to Resource Element, OFDM Baseband Signal Generation, and Modulation and Upconversion.

Embodiment 8

Figure 8:
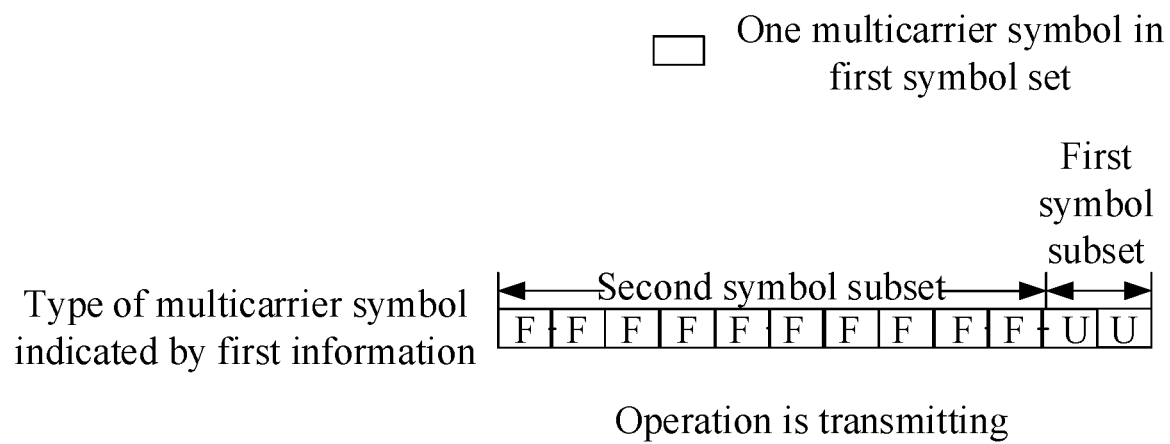
FIG. 8 illustrates a schematic diagram of determining a first symbol subset and a second symbol subset according to one embodiment of the present disclosure.

Embodiment 8 illustrates a schematic diagram of determining a first symbol subset and a second symbol subset according to one embodiment of the present disclosure, as shown in FIG. 8; herein, F represents Flexible and U represents UL.

In Embodiment 8, the operation in the present disclosure is transmitting, the first symbol subset comprises multicarrier symbol(s) in the first symbol set with the type of UL indicated by the first information in the present disclosure, and the second symbol subset comprises multicarrier symbol(s) in the first symbol set with the type of Flexible indicated by the first information.

Embodiment 9

Figure 9:
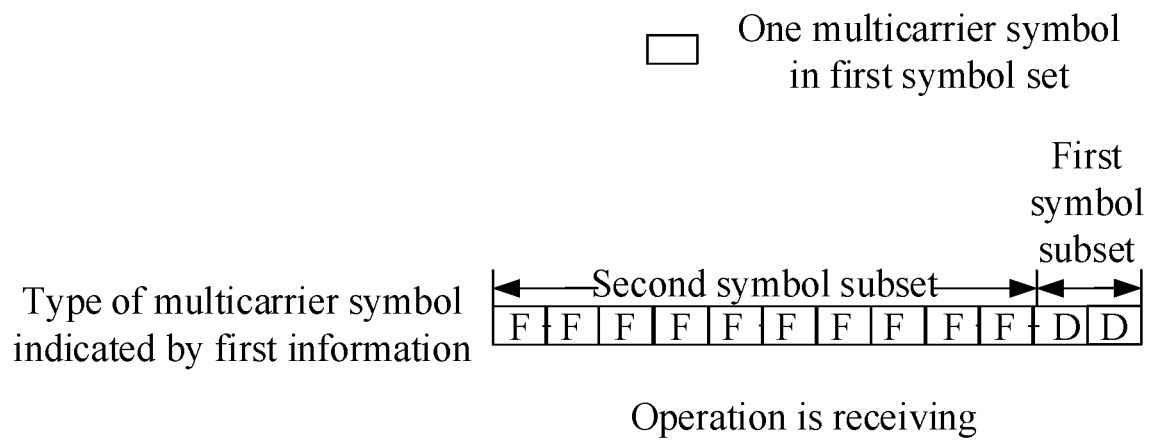
FIG. 9 illustrates a schematic diagram of determining a first symbol subset and a second symbol subset according to another embodiment of the present disclosure.

Embodiment 9 illustrates a schematic diagram of determining a first symbol subset and a second symbol subset according to another embodiment of the present disclosure, as shown in FIG. 9; herein, F represents Flexible and D represents DL.

In Embodiment 9, the operation in the present disclosure is receiving, the first symbol subset comprises multicarrier symbol(s) in the first symbol set with the type of DL indicated by the first information in the present disclosure, and the second symbol subset comprises multicarrier symbol(s) in the first symbol set with the type of Flexible indicated by the first information.

Embodiment 10

Figure 10:
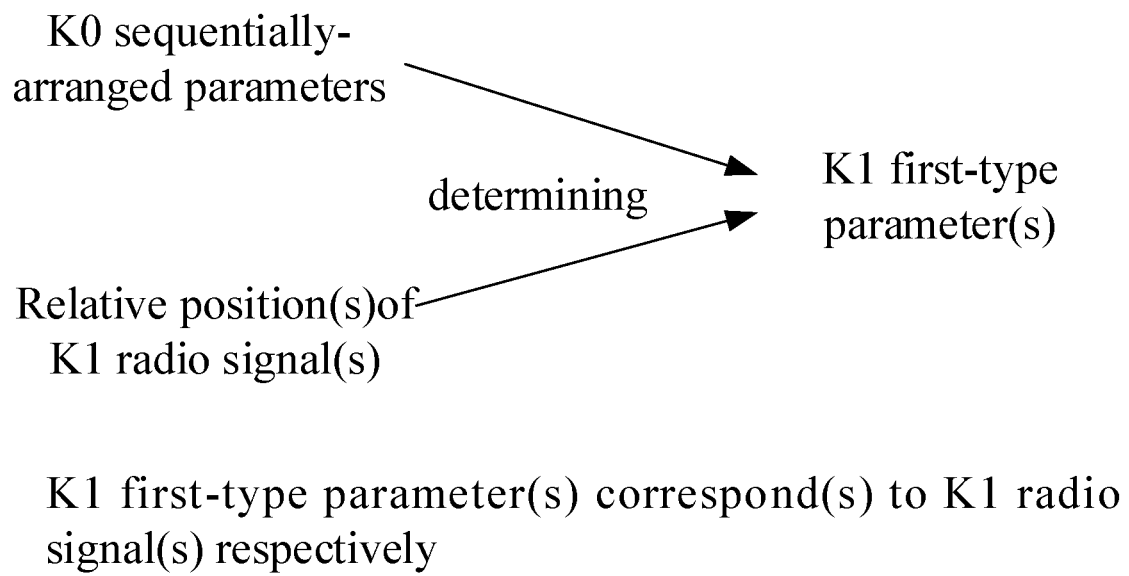
FIG. 10 illustrates a schematic diagram of K first-type parameters being related to a symbol subset to which K symbol groups belong according to one embodiment of the present disclosure.

Embodiment 10 illustrates a schematic diagram of K first-type parameters related to a symbol subset to which K symbol groups belong according to one embodiment of the present disclosure, as shown in FIG. 10.

In Embodiment 10, the first signaling in the present disclosure is used for determining K0 sequentially-arranged parameters, K0 being a positive integer greater than 1; any of the K first-type parameters is one of the K0 sequentially-arranged parameters; each of K1 symbol group(s) of the K symbol groups belongs to the first symbol subset in the present disclosure, K1 radio signal(s) of the K radio signals in the present disclosure is(are) respectively transmitted in the K1 symbol group(s), and K1 first-type parameter(s) of the K first-type parameters respectively correspond(s) to the K1 radio signal(s); the K0 sequentially-arranged parameters and relative position(s) of the K1 radio signal(s) are used for determining the K1 first-type parameter(s), one of the K1 first-type parameter(s) corresponding to an earliest one of the K1 radio signal(s) is a first parameter of the K0 sequentially-arranged parameters; K1 is a positive integer not greater than the K.

In one embodiment, the K1 is equal to the K.

In one embodiment, the K is greater than 1, and K1 is less than the K.

In one embodiment, the K1 is equal to 1, an earliest one of the K1 radio signal is the K1 radio signal, and one of the K1 first-type parameter corresponding to an earliest one of the K1 radio signal is the K1 first-type parameter.

In one embodiment, there exist two parameters being different of the K0 sequentially-arranged parameters.

In one embodiment, the first signaling is used for indicating the K0 sequentially-arranged parameters.

In one embodiment, the first signaling explicitly indicates the K0 sequentially-arranged parameters.

In one embodiment, the first signaling implicitly indicates the K0 sequentially-arranged parameters.

In one embodiment, the above method also comprises:
receiving fourth information;
wherein the fourth information indicates the K0 sequentially-arranged parameters, and the fourth information is configured to a radio signal scheduled by the first signaling.

In one subembodiment of the above embodiment, a signaling format of the first signaling indicates that the fourth information is configured to a radio signal scheduled by the first signaling.

In one subembodiment of the above embodiment, a signaling identifier of the first signaling indicates that the fourth information is configured to a radio signal scheduled by the first signaling.

In one subembodiment of the above embodiment, an RNTI of the first signaling indicates that the fourth information is configured to a radio signal scheduled by the first signaling.

In one subembodiment of the above embodiment, the fourth information indicates the K0 sequentially-arranged parameters.

In one subembodiment of the above embodiment, the fourth information is semi-statically configured.

In one subembodiment of the above embodiment, the fourth information is carried by a higher-layer signaling.

In one subembodiment of the above embodiment, the fourth information is carried by an RRC signaling.

In one subembodiment of the above embodiment, the fourth information is carried by a MAC CE signaling.

In one subembodiment of the above embodiment, the fourth information comprises one or more IEs of an RRC signaling.

In one subembodiment of the above embodiment, the fourth information comprises all or part of an IE in an RRC signaling.

In one subembodiment of the above embodiment, the fourth information comprises multiple IEs in an RRC signaling.

In one embodiment, the K0 sequentially-arranged parameters, relative position(s) of the K1 radio signal(s) and the K0 are used for determining the K1 first-type parameter(s).

In one embodiment, the K1 is not greater than the K0; the K1 radio signal(s) is(are) arranged according to an ascending chronological order, and the K1 first-type parameter(s) is(are) respectively first K1 parameter(s) of the K0 sequentially-arranged parameters.

In one embodiment, the K0 sequentially-arranged parameters are respectively 1st, 2nd, . . . K0th parameter of the K0 sequentially-arranged parameters, and positions of the K0 sequentially-arranged parameters respectively in the K0 sequentially-arranged parameters are 0, 1, . . . , K0−1.

In one embodiment, a given parameter is any of the K0 sequentially-arranged parameters, the given parameter is a i+1th parameter of the K0 sequentially-arranged parameters, and a position of the given parameter of the K0 sequentially-arranged parameters is i, the i being a non-negative integer less than the K0.

In one embodiment, the relative position(s) of the K1 radio signal(s) is(are) a sequence(sequences) that the K1 radio signal(s) arranged according to an ascending chronological order.

In one embodiment, the relative position(s) of the K1 radio signal(s) is(are) index(es) that the K1 radio signal(s) arranged according to an ascending chronological order.

In one embodiment, the K1 radio signal(s) is(are) arranged according to an ascending chronological order, the K1 radio signal(s) is(are) respectively 1st, 2nd, . . . , K1th radio signal of the K1 radio signal(s), and the relative position(s) of the K1 radio signal(s) is(are) respectively 0, 1, . . . , K1−1.

In one embodiment, position(s) of the K1 first-type parameter(s) in the K0 sequentially-arranged parameters is(are) respectively K1 non-negative integer(s) obtained after relative position(s) of the K1 radio signal(s) perform(s) a modulus operation on the K0.

In one embodiment, position(s) of the K1 first-type parameter(s) of the K0 sequentially-arranged parameters is(are) respectively 0 mod K0, 1 mod K0, . . . , (K1−1) mod K0.

In one embodiment, a given radio signal is any of the K1 radio signal(s), a given first-type parameter is one of the K1 first-type parameter(s) corresponding to the given radio signal, and a position of the given first-type parameter of the K0 sequentially-arranged parameters is a non-negative integer obtained after the relative position of the given radio signal performs a modulus operation on the K0.

In one subembodiment of the present disclosure, the given radio signal is a k+1th radio signal of the K1 radio signal(s), a relative position of the given radio signal is k, the k being a non-negative integer less than the K1, a position of the given first-type parameter of the K0 sequentially-arranged parameters is k mod K0, and the given first-type parameter is a (k mod K0)+1th parameter of the K0 sequentially-arranged parameters.

Embodiment 11

Figure 11:
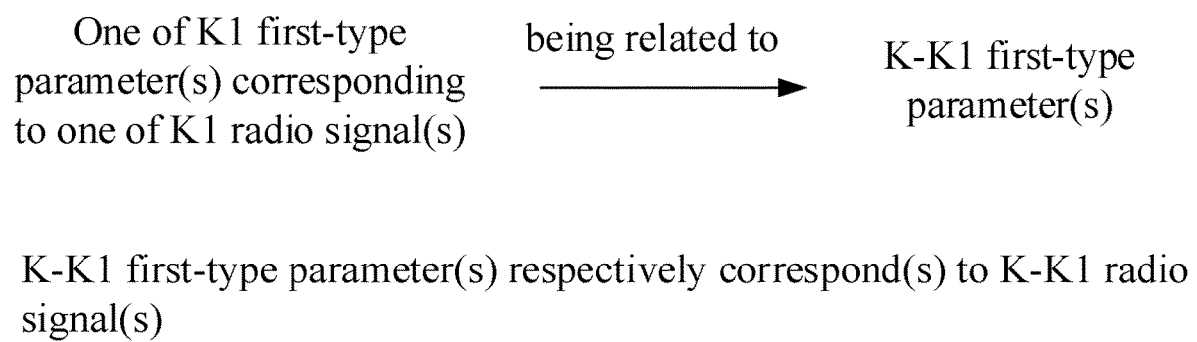
FIG. 11 illustrates a schematic diagram of K first-type parameters being related to a symbol subset to which K symbol groups belong according to another embodiment of the present disclosure.

Embodiment 11 illustrates a schematic diagram of K first-type parameters related to a symbol subset to which K symbol groups belong according to another embodiment of the present disclosure, as shown in FIG. 11.

In Embodiment 11, the K in the present disclosure is greater than 1, the K1 is less than the K, each of K−K1 symbol group(s) of the K symbol groups belongs to the second symbol subset in the present disclosure; K−K1 radio signal(s) of the K radio signals in the present disclosure is(are) respectively transmitted in the K−K1 symbol group(s), and K−K1 first-type parameter(s) of the K first-type parameters respectively correspond(s) to the K−K1 radio signal(s); and the K−K1 first-type parameter(s) is(are) related to one of the K1 first-type parameter(s) corresponding to one of the K1 radio signal(s).

In one embodiment, a third radio signal is one of the K1 radio signal(s), and the K−K1 first-type parameter(s) is(are) related to one of the K1 first-type parameter(s) corresponding to the third radio signal.

In one subembodiment of the above embodiment, the third radio signal is an earliest one of the K1 radio signal(s).

In one subembodiment of the above embodiment, the third radio signal is a latest one of the K1 radio signal(s).

In one subembodiment of the above embodiment, the third radio signal is one of the K1 radio signal(s) with a shortest time interval with the K−K1 radio signal(s).

In one subembodiment of the above embodiment, the third radio signal is one of the K1 radio signal(s) with a shortest time interval with one of the K−K1 radio signal(s).

In one subembodiment of the above embodiment, the third radio signal is one of the K1 radio signal(s) with a shortest time interval with an earliest one of the K−K1 radio signal(s).

In one subembodiment of the above embodiment, the third radio signal is one of the K1 radio signal(s) with a shortest time interval with a latest one of the K−K1 radio signal(s).

In one subembodiment of the above embodiment, the third radio signal is one of the K1 radio signal(s) with a longest time interval with the K−K1 radio signal(s).

In one subembodiment of the above embodiment, the third radio signal is one of the K1 radio signal(s) with a longest time interval with one of the K−K1 radio signal(s).

In one subembodiment of the above embodiment, the third radio signal is one of the K1 radio signal(s) with a longest time interval with a earliest one of the K−K1 radio signal(s).

In one subembodiment of the above embodiment, the third radio signal is one of the K1 radio signal(s) with a longest time interval with a latest one of the K−K1 radio signal(s).

In one subembodiment of the above embodiment, the third radio signal is predefined.

In one subembodiment of the above embodiment, the third radio signal is pre-configured.

In one subembodiment of the above embodiment, the third radio signal is configured by a higher-layer signaling.

In one subembodiment of the above embodiment, the third radio signal is indicated by the first signaling.

In one embodiment, a time interval between two radio signals refers to a time interval between start times of the two radio signals.

In one embodiment, a time interval between two radio signals refers to an absolute value of a difference value obtained by subtracting an end time of an earlier one between the two radio signals from a start time of a later one between the two radio signals.

In one embodiment, a distance between two radio signals refers to an absolute value of a difference value obtained by subtracting a start time of an earlier one of the two radio signals from a start time of a later one of the two radio signals.

In one embodiment, a time interval between a given radio signal and T given radio signals refers to a time interval between start times of the two radio signals, T being a positive integer greater than 1.

In one embodiment, a time interval between a given radio signal and T given radio signals refers to a time interval between start times of the given radio signal and the T given radio signals.

In one embodiment, a time interval between a given radio signal and T given radio signals refers to a time interval between the given radio signal and one of the T given radio signals.

In one embodiment, a time interval between a given radio signal and T given radio signals refers to a time interval between the given radio signal and an earliest one of the T given radio signals.

In one embodiment, a time interval between a given radio signal and T given radio signals refers to a time interval between the given radio signal and a latest one of the T given radio signals.

In one embodiment, a first parameter is one of the K1 first-type parameter(s) corresponding to the third radio signal, and a position of the first parameter of the K0 sequentially-arranged parameters are used for determining the K−K1 first-type parameter(s).

In one embodiment, a first parameter is one of the K1 first-type parameter(s) corresponding to the third radio signal, and a position of the first parameter of the K0 sequentially-arranged parameters and relative position(s) of the K−K1 radio signal(s) are used for determining the K−K1 first-type parameter(s).

In one embodiment, a first parameter is one of the K1 first-type parameter(s) corresponding to the third radio signal, and a position of the first parameter of the K0 sequentially-arranged parameters, the K0, and relative position(s) of the K−K1 radio signal(s) are used for determining the K−K1 first-type parameter(s).

In one embodiment, a first parameter is one of the K1 first-type parameter(s) corresponding to the third radio signal, and a position of the first parameter of the K0 sequentially-arranged parameters, the K−K1, the K0, and relative position(s) of the K−K1 radio signal(s) are used for determining the K−K1 first-type parameter(s).

In one embodiment, the relative position(s) of the K−K1 radio signal(s) is(are) a sequence of the K−K1 radio signal(s) arranged according to an ascending chronological order.

In one embodiment, the relative position(s) of the K−K1 radio signal(s) is(are) index(es) of the K−K1 radio signal(s) arranged according to an ascending chronological order.

In one embodiment, the K−K1 radio signal(s) is(are) arranged according to an ascending chronological order, the K−K1 radio signal(s) is(are) respectively 1st, 2nd, . . . , K−K1th radio signal of the K−K1 radio signal(s), and the relative position(s) of the K−K1 radio signal(s) is(are) respectively 0, 1, . . . , K−K1−1.

In one embodiment, a first parameter is one of the K1 first-type parameter(s) corresponding to the third radio signal, and a position of the first parameter of the K0 sequentially-arranged parameters is a, a being a non-negative integer less than the K1.

In one subembodiment of the above embodiment, position(s) of the K−K1 first-type parameter(s) of the K0 sequentially-arranged parameters is(are) respectively K−K1 non-negative integer(s) obtained after relative position(s) of the K−K1 radio signal(s) adds a+1 and then performs a modulus operation on the K0.

In one subembodiment of the above embodiment, position(s) of the K−K1 first-type parameter(s) of the K0 sequentially-arranged parameters is(are) respectively K−K1 non-negative integer(s) obtained after K–K1 value(s) adds a and then performs a modulus operation on the K0, and the K–K1 value(s) respectively equal(s) to relative position(s) of subtracting K–K1 radio signal(s) from K–K1.

In one subembodiment of the above embodiment, position(s) of the K–K1 first-type parameter(s) of the K0 sequentially-arranged parameters is(are) respectively (a+1) mod K0, (a+2) mod K0, . . . , (a+K–K1) mod K0.

In one subembodiment of the above embodiment, position(s) of the K–K1 first-type parameter(s) of the K0 sequentially-arranged parameters is(are) respectively (a+K–K1) mod K0, . . . , (a+2) mod K0, (a+1) mod K0.

In one subembodiment of the above embodiment, a given radio signal is any of the K–K1 radio signal(s), a given first-type parameter is one of the K–K1 first-type parameter(s) corresponding to the given radio signal, and a position of the given first-type parameter of the K0 sequentially-arranged parameters is a non-negative integer obtained after the relative position of the given radio signal adds a+1 and then performs a modulus operation on the K0.

In one subembodiment of the above embodiment, a given radio signal is any of the K–K1 radio signal(s), a given first-type parameter is one of the K–K1 first-type parameter(s) corresponding to the given radio signal, and a position of the given first-type parameter of the K0 sequentially-arranged parameters is a non-negative integer obtained after a first value performs a modulus operation on the K0, and the first value is a integer equals to the a adds the K–K1 and then subtracts the relative position of the given radio signal.

In one subembodiment of the above embodiment, the given radio signal is a t+1th radio signal of the K–K1 radio signal(s), a relative position of the given radio signal is t, the t being a non-negative integer less than the K–K1, a position of the given first-type parameter of the K0 sequentially-arranged parameters is (a+1+t) mod K0, and the given first-type parameter is a (a+1+t) mod K0+1th parameter of the K0 sequentially-arranged parameters.

In one subembodiment of the above embodiment, the given radio signal is a t+1th radio signal of the K–K1 radio signal(s), a relative position of the given radio signal is t, the t being a non-negative integer less than the K–K1, a position of the given first-type parameter of the K0 sequentially-arranged parameters is (a+K–K1–t)) mod K0, and the given first-type parameter is a ((a+K–K1–t) mod K0)+1th parameter of the K0 sequentially-arranged parameters.

Embodiment 12

Figure 12:
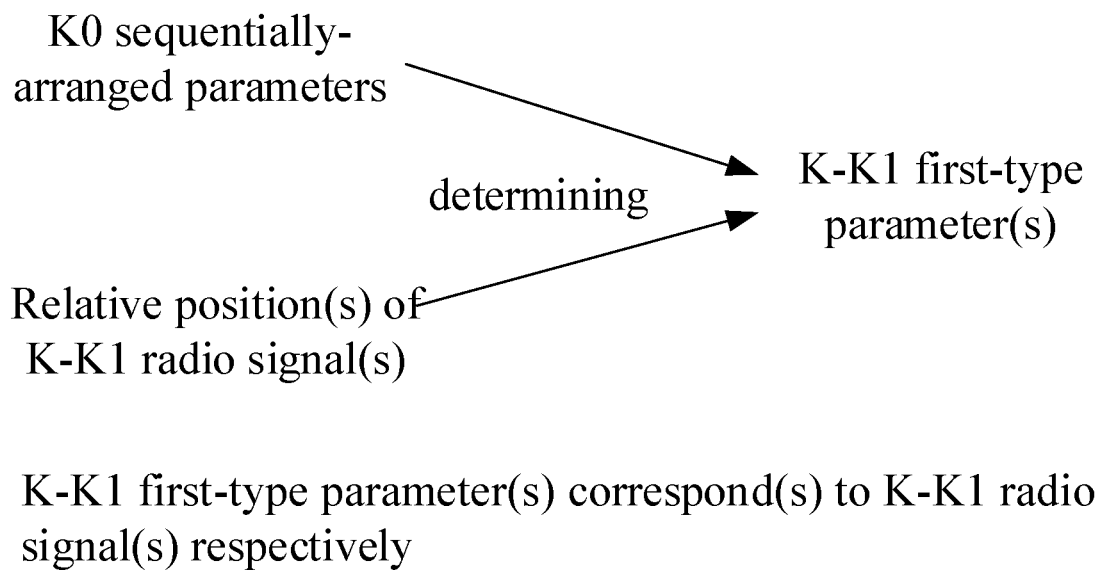
FIG. 12 illustrates a schematic diagram of K first-type parameters being related to a symbol subset to which K symbol groups belong according to another embodiment of the present disclosure.

Embodiment 12 illustrates a schematic diagram of K first-type parameters related to a symbol subset to which K symbol groups belong according to another embodiment of the present disclosure, as shown in FIG. 12.

In Embodiment 12, the K in the present disclosure is greater than 1, the K1 is less than the K, each of K–K1 symbol group(s) of the K symbol groups belongs to the second symbol subset in the present disclosure; K–K1 radio signal(s) of the K radio signals in the present disclosure is(are) respectively transmitted in the K–K1 symbol group(s), and K–K1 first-type parameter(s) of the K first-type parameters respectively correspond(s) to the K–K1 radio signal(s); the K0 sequentially-arranged parameters and relative position(s) of the K–K1 radio signal(s) are used for determining the K–K1 first-type parameter(s), and one of the K–K1 first-type parameter(s) corresponding to an earliest one of the K–K1 radio signal(s) is a first one of the K0 sequentially-arranged parameters.

In one embodiment, the K–K1 is equal to 1, an earliest one of the K–K1 radio signal is the K–K1 radio signal, and one of the K–K1 first-type parameter corresponding to an earliest one of the K–K1 radio signal is the K–K1 first-type parameter.

In one embodiment, the K0 sequentially-arranged parameters, relative position(s) of the K–K1 radio signal(s) and the K0 are used for determining the K–K1 first-type parameter(s).

In one embodiment, the K–K1 is not greater than the K0; the K–K1 radio signal(s) is(are) arranged according to an ascending chronological order, and the K–K1 first-type parameter(s) is(are) respectively first K–K1 parameter(s) of the K0 sequentially-arranged parameters.

In one embodiment, the relative position(s) of the K–K1 radio signal(s) is(are) a sequence(sequences) of the K–K1 radio signal(s) arranged according to an ascending chronological order.

In one embodiment, the relative position(s) of the K–K1 radio signal(s) is(are) index(es) of the K–K1 radio signal(s) arranged according to an ascending chronological order.

In one embodiment, the K–K1 radio signal(s) is(are) arranged according to an ascending chronological order, the K–K1 radio signal(s) is(are) respectively 1st, 2nd, . . . , K–K1th radio signal of the K–K1 radio signal(s), and the relative position(s) of the K–K1 radio signal(s) is(are) respectively 0, 1, . . . , K–K1–1.

In one embodiment, position(s) of the K–K1 first-type parameter(s) in the K0 sequentially-arranged parameters is(are) respectively K–K1 non-negative integer(s) obtained after relative position(s) of the K–K1 radio signal(s) perform(s) modulus operation on the K0.

In one embodiment, a given radio signal is any of the K–K1 radio signal(s), a given first-type parameter is one of the K–K1 first-type parameter(s) corresponding to the given radio signal, and a position of the given first-type parameter of the K0 sequentially-arranged parameters is a non-negative integer obtained after the relative position of the given radio signal performs modulus operation on the K0.

In one subembodiment of the present disclosure, the given radio signal is a k+1th radio signal of the K–K1 radio signal(s), a relative position of the given radio signal is k, the k being a non-negative integer less than the K–K1, a position of the given first-type parameter of the K0 sequentially-arranged parameters is k nod K0, and the given first-type parameter is a (k mod K0)+1th parameter of the K0 sequentially-arranged parameters.

Embodiment 13

Figure 13:
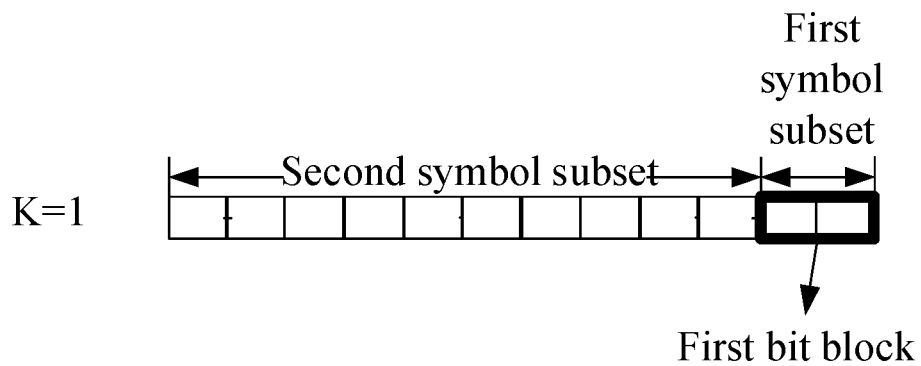
FIG. 13 illustrates a schematic diagram of determining the K symbol groups according to one embodiment of the present disclosure.

Embodiment 13 illustrates a schematic diagram of determining the K symbol groups according to one embodiment of the present disclosure, as shown in FIG. 13.

In Embodiment 13, when the first node in the present disclosure does not detect the second signaling in the present disclosure in the first time-frequency-resource-group set, and each of the K symbol groups belongs to the first symbol subset in the present disclosure.

In one embodiment, when the second signaling is not detected in the first time-frequency-resource-group set, the first bit block is transmitted in only the K symbol groups in the first symbol set.

Embodiment 14

Figure 14:
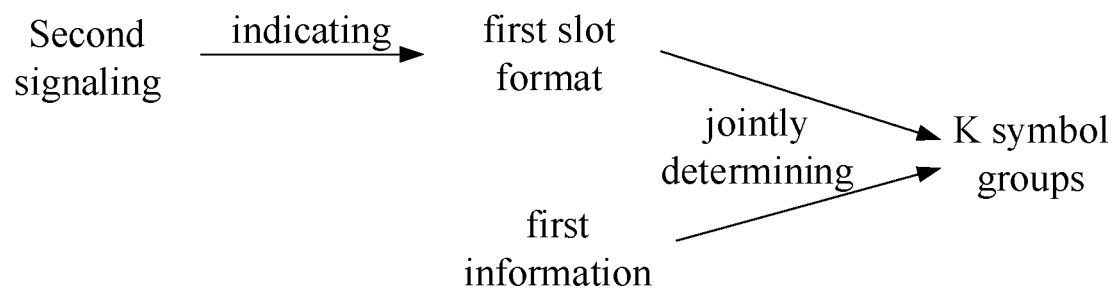
FIG. 14 illustrates a schematic diagram of determining the K symbol groups according to another embodiment of the present disclosure.

Embodiment 14 illustrates a schematic diagram of determining the K symbol groups according to another embodiment of the present disclosure, as shown in FIG. 14.

In Embodiment 14, when the first node in the present disclosure detects the second signaling in the present disclosure in the first time-frequency-resource-group set in the present disclosure, the second signaling is used for indicating a first slot format, and the first slot format and the first information in the present disclosure are used together for determining the K symbol groups out of the first symbol set.

In one embodiment, when the second signaling is detected in the first time-frequency-resource-group set, the first node receives the second signaling in the first time-frequency-resource-group set.

In one embodiment, the first slot format is used for indicating a type of each multicarrier symbol in the first symbol set.

In one embodiment, the first slot format explicitly indicates a type of each multicarrier symbol in the first symbol set.

In one embodiment, the first slot format implicitly indicates a type of each multicarrier symbol in the first symbol set.

In one embodiment, a given multicarrier symbol is any multicarrier symbol in the first symbol set, the given multicarrier symbol is a j-th multicarrier symbol in a time-domain unit to which it belongs, a type of the given multicarrier symbol indicated by the first slot format is a type of j-th multicarrier symbol in a time-domain unit indicated by the first slot format, j being a positive integer not greater than a number of multicarrier symbol(s) comprised in the slot.

In one embodiment, the first slot format is Slot Format.

In one embodiment, the first slot format is a slot format of a slot.

In one embodiment, the first slot format indicates a type of each multicarrier symbol in a time-domain unit.

In one embodiment, the first slot format indicates type(s) of a positive integer number of multicarrier symbol(s).

In one embodiment, the first slot format is a slot format of each slot in a number of slots starting from the first node monitoring a slot of the second signaling.

In one embodiment, a value of the first slot format is a non-negative integer other than 255.

In one embodiment, a value of the first slot format is a non-negative less than 255.

In one embodiment, the time-domain unit is a slot.

In one embodiment, the time-domain unit is a subframe.

In one embodiment, the time-domain unit is a mini-slot.

In one embodiment, the time-domain unit comprises a positive integer number of multi-carrier symbol(s).

In one embodiment, the second signaling explicitly indicates a first slot format.

In one embodiment, the second signaling implicitly indicates a first slot format.

In one embodiment, the second signaling indicates a positive integer number of Slot Format Indicator (SFI) value(s), and the first slot format is a slot format corresponding to one of the positive integer number of SFI value(s).

In one embodiment, the first slot format and the first information are used together for determining a third symbol subset out of the first symbol set, the third symbol subset comprises a multicarrier symbol for transmitting the first bit block, and the third symbol subset comprises the K symbol groups.

In one subembodiment of the above embodiment, the third symbol subset only comprises the K symbol groups.

In one subembodiment of the above embodiment, the third symbol subset also comprises the first symbol group in the present disclosure, and the first symbol group comprises a positive integer number of multicarrier symbol(s) other than the K symbol groups in the first symbol set.

In one embodiment, the operation, the first slot format and the first information are used together for determining a given symbol set out of the first symbol set.

In one subembodiment of the above embodiment, the given symbol set is the third symbol subset in the present disclosure.

In one subembodiment of the above embodiment, the given symbol set is the K symbol groups in the present disclosure.

In one embodiment, the first information is used for indicating a type of each multicarrier symbol in the first symbol set, and the first slot format is used for indicating a type of each multicarrier symbol in the first symbol set; the operation, the type of each multicarrier symbol in the first symbol set indicated by the first information and the type of each multicarrier symbol in the first symbol set indicated by the first slot format are used together for determining a given symbol set out of the first symbol set.

In one subembodiment of the above embodiment, the given symbol set is the third symbol subset in the present disclosure.

In one subembodiment of the above embodiment, the given symbol set is the K symbol groups in the present disclosure.

In one embodiment, a given symbol is a multicarrier symbol in the first symbol set; the operation is receiving, and the first node does not expect a type of the given symbol indicated by the first slot format to be UL.

In one embodiment, a given symbol is a multicarrier symbol in the first symbol set; the operation is transmitting, and the first node does not expect a type of the given symbol indicated by the first slot format to be DL.

In one embodiment, a given symbol is a multicarrier symbol in the first symbol set; when a type of the given symbol indicated by the first information is DL, the first node does not expect a type of the given symbol indicated by the first slot format to be UL.

In one embodiment, a given symbol is a multicarrier symbol in the first symbol set; when a type of the given symbol indicated by the first information is UL, the first node does not expect a type of the given symbol indicated by the first slot format to be DL.

In one embodiment, a given symbol is a multicarrier symbol in the first symbol set; when a type of the given symbol indicated by the first information is Flexible, whether the given symbol belongs to a given symbol set is related to a type of the given symbol indicated by the first slot format.

In one subembodiment of the above embodiment, the given symbol set is the third symbol subset in the present disclosure.

In one subembodiment of the above embodiment, the given symbol set is the K symbol groups in the present disclosure.

In one subembodiment of the above embodiment, when the first slot format indicates that a type of the given symbol is Flexible, the given symbol belongs to the given symbol set.

In one subembodiment of the above embodiment, the operation is receiving; the first node does not expect to detect that the first slot format indicates that a type of the given symbol is UL.

In one subembodiment of the above embodiment, the operation is transmitting; and the first node does not expect to detect that the first slot format indicates that a type of the given symbol is DL.

In one subembodiment of the above embodiment, the operation is receiving; if and only if the first slot format indicates that the type of the given symbol is DL, the given symbol belongs to the given symbol set; when the first slot format indicates that the type of the given symbol is UL or Flexible, the given symbol does not belong to the given symbol set.

In one subembodiment of the above embodiment, the operation is receiving; if and only if the first slot format indicates that the type of the given symbol is DL or Flexible, the given symbol belongs to the given symbol set; when the first slot format indicates that the type of the given symbol is UL, the given symbol does not belong to the given symbol set.

In one subembodiment of the above embodiment, the operation is transmitting; if and only if the first slot format indicates that the type of the given symbol is UL, the given symbol belongs to the given symbol set; when the first slot format indicates that the type of the given symbol is DL or Flexible, the given symbol does not belong to the given symbol set.

In one subembodiment of the above embodiment, the operation is transmitting; if and only if the first slot format indicates that the type of the given symbol is UL or Flexible, the given symbol belongs to the given symbol set; when the first slot format indicates that the type of the given symbol is DL, the given symbol does not belong to the given symbol set.

Embodiment 15

Figure 15:
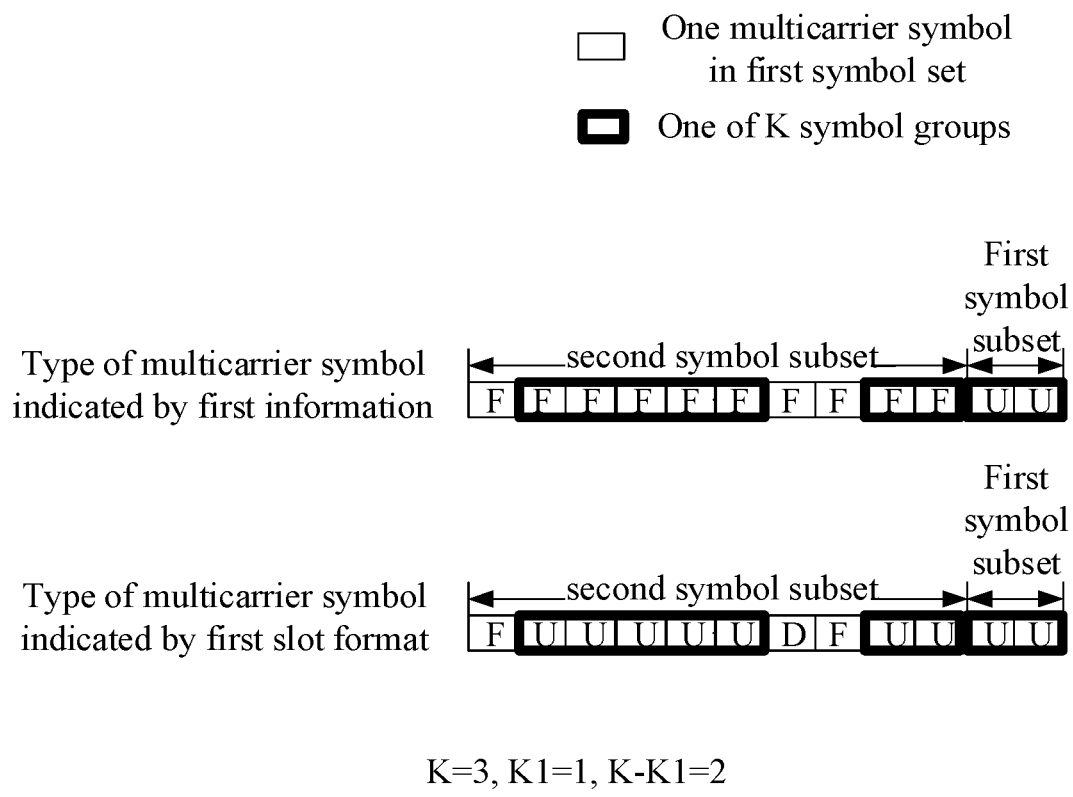
FIG. 15 illustrates a schematic diagram of a relationship between a first slot format and K-K1 symbol group(s) according to one embodiment of the present disclosure.

Embodiment 15 illustrates a schematic diagram of a relationship between a first slot format and K-K1 symbol group(s) according to one embodiment of the present disclosure, as shown in FIG. 15.

In Embodiment 15, K-K1 symbol group(s) of the K symbol groups in the present disclosure belong(s) to the second symbol subset in the present disclosure, K1 being a positive integer less than the K; the operation in the present disclosure is transmitting, and the first slot format is used for indicating that the type of each multicarrier symbol in the K-K1 symbol group(s) is UL, or the first slot format is used for indicating that the type of each multicarrier symbol in the K-K1 symbol group(s) is UL or Flexible.

In one embodiment, the type of each multicarrier symbol in the K-K1 symbol group(s) indicated by the first information is Flexible.

In one embodiment, the operation is transmitting, and the first slot format is used for indicating that a type of each multicarrier symbol in the K-K1 symbol group(s) is UL.

In one embodiment, the operation is transmitting, and the first slot format is used for indicating that a type of each multicarrier symbol in the K-K1 symbol group(s) is UL or Flexible.

In one embodiment, the type of each multicarrier symbol in the K-K1 symbol group(s) indicated by the first information and the first symbol group in the present disclosure is Flexible.

In one embodiment, the operation is transmitting, and the first slot format is used for indicating a type of each multicarrier symbol in the K-K1 symbol group(s) and the first symbol group in the present disclosure is UL.

In one embodiment, the operation is transmitting, and the first slot format is used for indicating a type of each multicarrier symbol in the K-K1 symbol group(s) and the first symbol group in the present disclosure is UL or Flexible.

Embodiment 16

Figure 16:
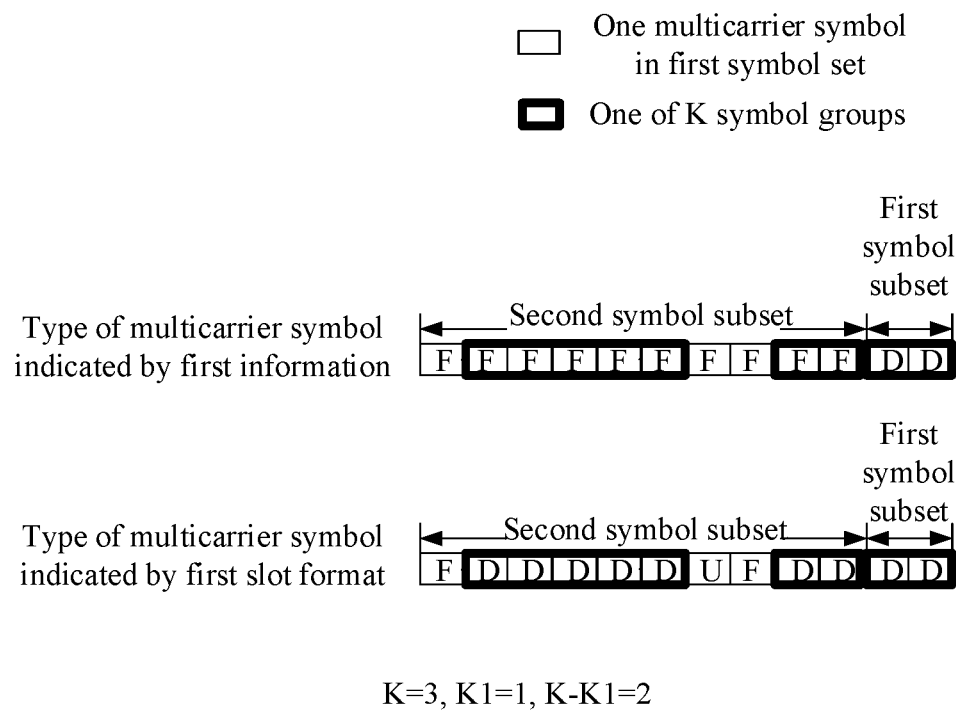
FIG. 16 illustrates a schematic diagram of a relationship between a first slot format and K-K1 symbol group(s) according to another embodiment of the present disclosure.

Embodiment 16 illustrates a schematic diagram of a relationship between a first slot format and K-K1 symbol group(s) according to another embodiment of the present disclosure, as shown in FIG. 16.

In Embodiment 16, K-K1 symbol group(s) of the K symbol groups in the present disclosure belong(s) to the second symbol subset in the present disclosure, K1 being a positive integer less than the K; the operation in the present disclosure is receiving, and the first slot format is used for indicating that the type of each multicarrier symbol in the K-K1 symbol group(s) is DL, or the first slot format is used for indicating that the type of each multicarrier symbol in the K-K1 symbol group(s) is DL or Flexible.

In one embodiment, the type of each multicarrier symbol in the K-K1 symbol group(s) indicated by the first information is Flexible.

In one embodiment, the operation is receiving, the first slot format is used for indicating that the type of each multicarrier symbol in the K-K1 symbol group(s) is DL.

In one embodiment, the operation is receiving, the first slot format is used for indicating that the type of each multicarrier symbol in the K-K1 symbol group(s) is DL or Flexible.

In one embodiment, the type each multicarrier symbol in the K-K1 symbol group(s) indicated by the first information and the first symbol group in the present disclosure is Flexible.

In one embodiment, the operation is receiving, and the first slot format is used for indicating the type of each multicarrier symbol in the K-K1 symbol group(s) and the first symbol group in the present disclosure is DL.

In one embodiment, the operation is receiving, and the first slot format is used for indicating the type of each multicarrier symbol in the K-K1 symbol group(s) and the first symbol group in the present disclosure is DL or Flexible.

Embodiment 17

Figure 17:
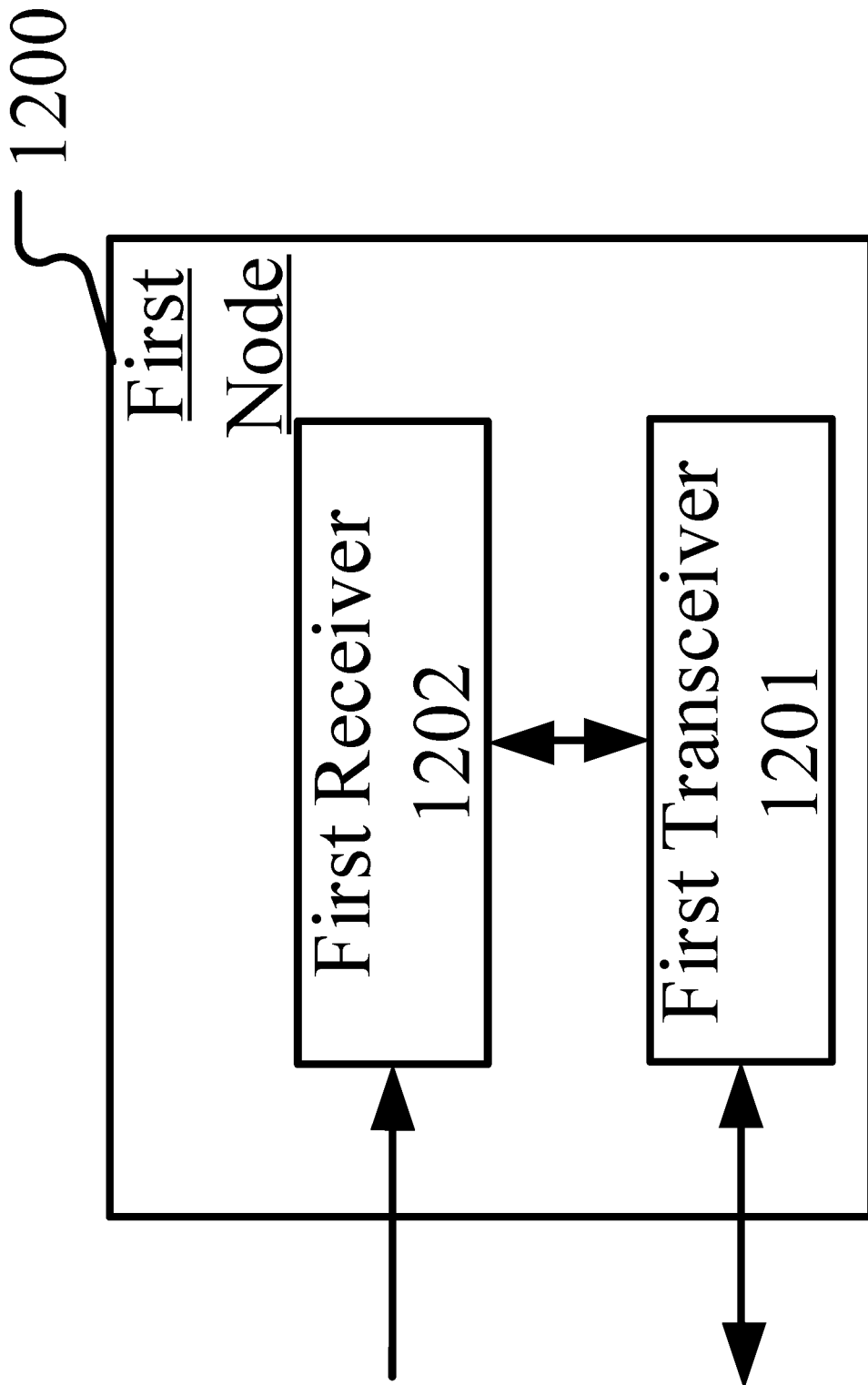
FIG. 17 illustrates a structure block diagram of a processing device in a first node according to one embodiment of the present disclosure.

Embodiment 17 illustrates a structural block diagram of a processing device in a first node, as shown in FIG. 17. In FIG. 17, a first node processing device 1200 comprises a first transceiver 1201 and a first receiver 1202.

In one embodiment, the first node 1200 is a UE.
In one embodiment, the first node 1200 is a relay node.
In one embodiment, the first node 1200 is a base station.
In one embodiment, the first node 1200 is a vehicle-mounted communication device.
In one embodiment, the first node 1200 is a UE supporting V2X communications.
In one embodiment, the first node 1200 is a relay node supporting V2X communications.
In one embodiment, the first transceiver 1201 comprises at least one of an antenna 452, a transmitter/receiver 454, a multi-antenna transmitting processor 457, a multi-antenna receiving processor 458, a transmitting processor 468, a receiving processor 456, a controller/processor 459, a memory 460 or a data source 467 in FIG. 4 of the present disclosure.

In one embodiment, the first transceiver 1201 comprises at least the first seven of an antenna 452, a transmitter/receiver 454, a multi-antenna transmitting processor 457, a multi-antenna receiving processor 458, a transmitting processor 468, a receiving processor 456, a controller/processor 459, a memory 460 or a data source 467 in FIG. 4 of the present disclosure.

In one embodiment, the first transceiver 1201 comprises at least the first six of an antenna 452, a transmitter/receiver 454, a multi-antenna transmitting processor 457, a multi-antenna receiving processor 458, a transmitting processor 468, a receiving processor 456, a controller/processor 459, a memory 460 or a data source 467 in FIG. 4 of the present disclosure.

In one embodiment, the first transceiver 1201 comprises at least the first four of an antenna 452, a transmitter/receiver 454, a multi-antenna transmitting processor 457, a multi-antenna receiving processor 458, a transmitting processor 468, a receiving processor 456, a controller/processor 459, a memory 460 or a data source 467 in FIG. 4 of the present disclosure.

In one embodiment, the first transceiver 1201 comprises at least first five of an antenna 452, a transmitter/receiver 454, a multi-antenna transmitting processor 457, a transmitting processor 468, a controller/processor 459, a multi-antenna receiving processor 458, a receiving processor 456, a memory 460 or a data source 467 in FIG. 4 of the present disclosure.

In one embodiment, the first transceiver 1201 comprises at least first four of an antenna 452, a transmitter/receiver 454, a multi-antenna transmitting processor 457, a transmitting processor 468, a controller/processor 459, a multi-antenna receiving processor 458, a receiving processor 456, a memory 460 or a data source 467 in FIG. 4 of the present disclosure.

In one embodiment, the first transceiver 1201 comprises at least first three of an antenna 452, a transmitter/receiver 454, a multi-antenna transmitting processor 457, a transmitting processor 468, a controller/processor 459, a multi-antenna receiving processor 458, a receiving processor 456, a memory 460 or a data source 467 in FIG. 4 of the present disclosure.

In one embodiment, the first receiver 1202 comprises at least one of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first five of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first four of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first three of an antenna 452, a receiver 454, a multi-antenna receiving processor 458, a receiving processor 456, a controller/processor 459, a memory 460 or a data source 467 in FIG. 4 of the present disclosure.

In one embodiment, the first receiver 1202 comprises at least the first two of an antenna 452, a receiver 454, a multi-antenna receiving processor 458, a receiving processor 456, a controller/processor 459, a memory 460 or a data source 467 in FIG. 4 of the present disclosure.

A first receiver 1202, receives first information; and receives a first signaling, the first signaling being used for indicating a first symbol set;

a first transceiver 1201, operates K radio signals respectively in K symbol groups in the first symbol set, K being a positive integer greater than 1.

In Embodiment 17, the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the operation is transmitting, or, the operation is receiving.

In one embodiment, the operation is transmitting, the first symbol subset comprises multicarrier symbol(s) in the first symbol set with the type of UL indicated by the first information, and the second symbol subset comprises multicarrier symbol(s) in the first symbol set with the type of Flexible indicated by the first information; or, the operation is receiving, the first symbol subset comprises multicarrier symbol(s) in the first symbol set with the type of DL indicated by the first information, and the second symbol subset comprises multicarrier symbol(s) in the first symbol set with the type of Flexible indicated by the first information.

In one embodiment, the first signaling is used for determining K0 sequentially-arranged parameters, K0 being a positive integer greater than 1; any of the K first-type parameters is one of the K0 sequentially-arranged parameters; each of K1 symbol group(s) of the K symbol groups belongs to the first symbol subset, K1 radio signal(s) of the K radio signals is(are) respectively transmitted in the K1 symbol group(s), and K1 first-type parameter(s) of the K first-type parameters respectively correspond(s) to the K1 radio signal(s); the K0 sequentially-arranged parameters and relative position(s) of the K1 radio signal(s) are used for determining the K1 first-type parameter(s), one of the K1 first-type parameter(s) corresponding to an earliest one of the K1 radio signal(s) is a first parameter of the K0 sequentially-arranged parameters; K1 is a positive integer not greater than the K.

In one embodiment, the K is greater than 1, the K1 is less than the K, each of K−K1 symbol group(s) of the K symbol groups belongs to the second symbol subset; K−K1 radio signal(s) of the K radio signals is(are) respectively transmitted in the K−K1 symbol group(s), and K−K1 first-type parameter(s) of the K first-type parameters respectively correspond(s) to the K−K1 radio signal(s); the K−K1 first-type parameter(s) is(are) related to one of the K1 first-type parameter(s) corresponding to one of the K1 radio signal(s), or, the K0 sequentially-arranged parameters and relative position(s) of the K−K1 radio signal(s) are used for determining the K−K1 first-type parameter(s), one of the K−K1 first-type parameter(s) corresponding to an earliest one of the K−K1 radio signal(s) is the first parameter of the K0 sequentially-arranged parameters.

In one embodiment, the first receiver 1202 also receives second information; receives third information; and monitors a second signaling in a first time-frequency-resource-group set; wherein the second information indicates a first identifier, and the second signaling carries the first identifier; the third information is used for indicating the first time-frequency-resource-group set, and the second signaling is a physical-layer signaling; whether the second signaling is detected in the first time-frequency-resource-group set is used for determining the K symbol groups.

In one embodiment, when the second signaling is detected in the first time-frequency-resource-group set, the second signaling is used for indicating a first slot format, and the first slot format and the first information are used together for determining the K symbol groups out of the first symbol set.

In one embodiment, K−K1 symbol group(s) of the K symbol groups belong(s) to the second symbol subset, K1 being a positive integer less than the K; the operation is transmitting, the first slot format is used for indicating that the type of each multicarrier symbol in the K−K1 symbol group(s) is UL, or the first slot format is used for indicating that the type of each multicarrier symbol in the K−K1 symbol group(s) is UL or Flexible; or, the operation is receiving, the first slot format is used for indicating that the type of each multicarrier symbol in the K−K1 symbol group(s) is DL, or the first slot format is used for indicating that the type of each multicarrier symbol in the K−K1 symbol group(s) is DL or Flexible.

Embodiment 18

Figure 18:
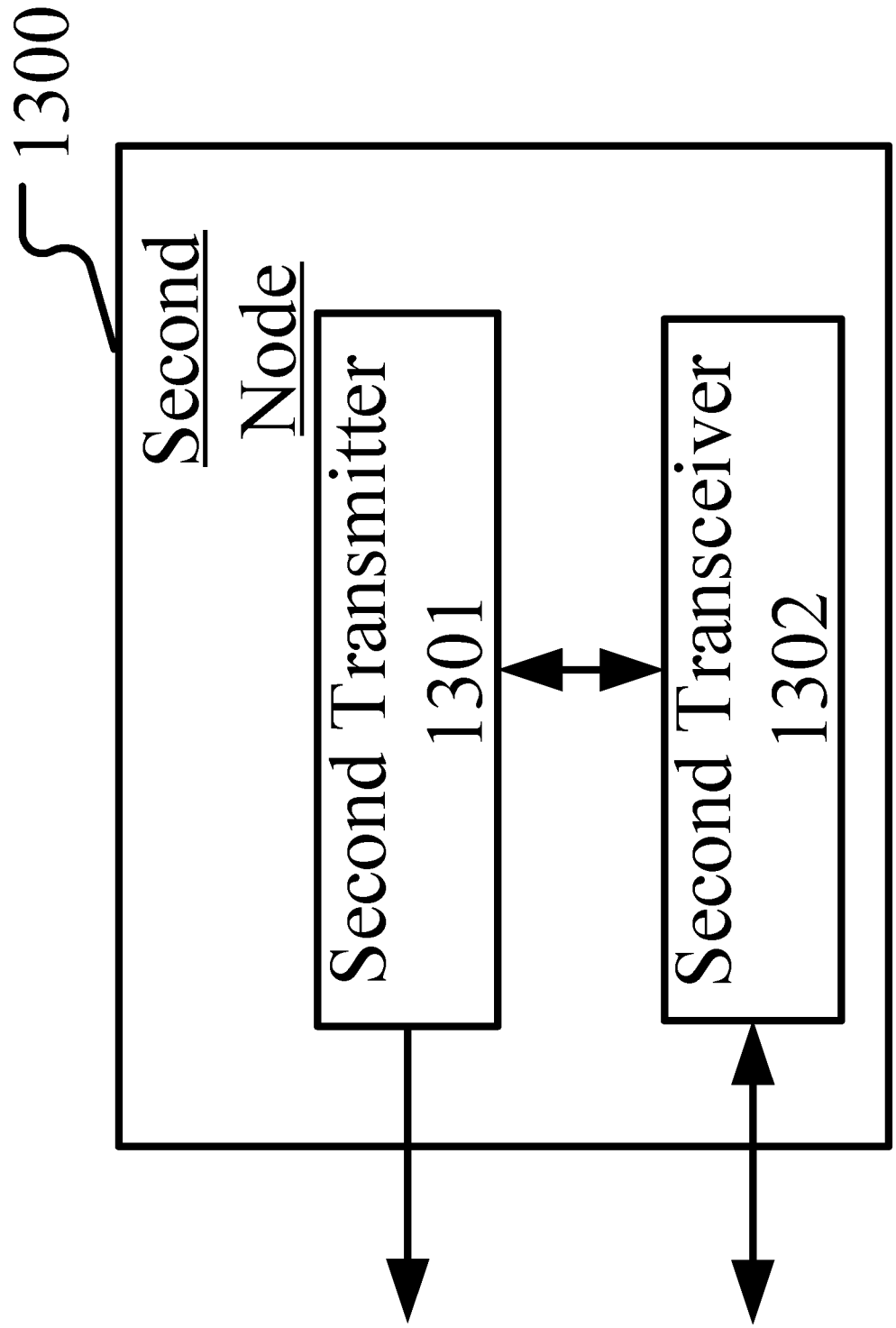
FIG. 18 illustrates a structure block diagram of a processing device in second node according to one embodiment of the present disclosure.

Embodiment 18 illustrates a structural block diagram of a processing device in a second node, as shown in FIG. 18. In FIG. 18, a second node processing device 1300 comprises a second transmitter 1301 and a second transceiver 1302.

In one embodiment, the second node 1300 is a UE.

In one embodiment, the second node 1300 is a base station.

In one embodiment, the second node 1300 is a relay node.

In one embodiment, the second transmitter 1301 comprises at least one of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first five of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first four of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first three of an antenna 420, a transmitter 418, a multi-antenna transmitting processor 471, a transmitting processor 416, a controller/processor 475 or a memory 476 in FIG. 4 of the present disclosure.

In one embodiment, the second transmitter 1301 comprises at least the first two of an antenna 420, a transmitter 418, a multi-antenna transmitting processor 471, a transmitting processor 416, a controller/processor 475 or a memory 476 in FIG. 4 of the present disclosure.

In one embodiment, the second transceiver 1302 comprises at least one of an antenna 420, a transmitter/receiver 418, a multi-antenna transmitting processor 471, a multi-antenna receiving processor 472, a transmitting processor 416, a receiving processor 470, a controller/processor 475 or a memory 476 in FIG. 4 of the present disclosure.

In one embodiment, the second transceiver 1302 comprises at least first seven of an antenna 420, a transmitter/receiver 418, a multi-antenna transmitting processor 471, a multi-antenna receiving processor 472, a transmitting processor 416, a receiving processor 470, a controller/processor 475 or a memory 476 in FIG. 4 of the present disclosure.

In one embodiment, the second transceiver 1302 comprises at least first six of an antenna 420, a transmitter/receiver 418, a multi-antenna transmitting processor 471, a multi-antenna receiving processor 472, a transmitting processor 416, a receiving processor 470, a controller/processor 475 or a memory 476 in FIG. 4 of the present disclosure.

In one embodiment, the second transceiver 1302 comprises at least first four of an antenna 420, a transmitter/receiver 418, a multi-antenna transmitting processor 471, a multi-antenna receiving processor 472, a transmitting processor 416, a receiving processor 470, a controller/processor 475 or a memory 476 in FIG. 4 of the present disclosure.

In one embodiment, the second transceiver 1302 comprises at least first five of an antenna 420, a transmitter/receiver 418, a multi-antenna receiving processor 472, a receiving processor 470, a controller/processor 475, a multi-antenna transmitting processor 471, a transmitting processor 416 or a memory 476 in FIG. 4 of the present disclosure.

In one embodiment, the second transceiver 1302 comprises at least first four of an antenna 420, a transmitter/receiver 418, a multi-antenna receiving processor 472, a receiving processor 470, a controller/processor 475, a multi-antenna transmitting processor 471, a transmitting processor 416 or a memory 476 in FIG. 4 of the present disclosure.

In one embodiment, the second transceiver 1302 comprises at least first three of an antenna 420, a transmitter/receiver 418, a multi-antenna receiving processor 472, a receiving processor 470, a controller/processor 475, a multi-antenna transmitting processor 471, a transmitting processor 416 or a memory 476 in FIG. 4 of the present disclosure.

A second transmitter 1301, transmits first information; and transmits a first signaling, the first signaling is used for indicating a first symbol set;

a second transceiver 1302, implements K radio signals respectively in K symbol groups in the first symbol set, K being a positive integer greater than 1.

In Embodiment 18, the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is used for indicating a type of each multicarrier symbol in the first symbol set, and the first information is used for determining the first symbol subset and the second symbol subset; any group of the K symbol groups belongs to one of the first symbol subset and the second symbol subset; each of the K radio signals carries a first bit block, the first bit block comprising a positive integer number of bit(s), the K radio signals respectively correspond to K first-type parameters, and the K first-type parameters are related to symbol subsets to which the K symbol groups respectively belong; the implementation is receiving, or, the implementation is transmitting.

In one embodiment, the implementation is receiving, the first symbol subset comprises multicarrier symbol(s) in the first symbol set with the type of UL indicated by the first information, and the second symbol subset comprises multicarrier symbol(s) in the first symbol set with the type of Flexible indicated by the first information; or, the implementation is transmitting, the first symbol subset comprises multicarrier symbol(s) in the first symbol set with the type of DL indicated by the first information, and the second symbol subset comprises multicarrier symbol(s) in the first symbol set with the type of Flexible indicated by the first information.

In one embodiment, the first signaling is used for determining K0 sequentially-arranged parameters, K0 being a positive integer greater than 1; any of the K first-type parameters is one of the K0 sequentially-arranged parameters; each of K1 symbol group(s) of the K symbol groups belongs to the first symbol subset, K1 radio signal(s) of the K radio signals is(are) respectively transmitted in the K1 symbol group(s), and K1 first-type parameter(s) of the K first-type parameters respectively correspond(s) to the K1 radio signal(s); the K0 sequentially-arranged parameters and relative position(s) of the K1 radio signal(s) are used for determining the K1 first-type parameter(s), one of the K1 first-type parameter(s) corresponding to an earliest one of the K1 radio signal(s) is a first parameter of the K0 sequentially-arranged parameters; K1 is a positive integer not greater than the K.

In one embodiment, the K is greater than 1, the K1 is less than the K, each of K−K1 symbol group(s) of the K symbol groups belongs to the second symbol subset; K−K1 radio signal(s) of the K radio signals is(are) respectively transmitted in the K−K1 symbol group(s), and K−K1 first-type parameter(s) of the K first-type parameters respectively correspond(s) to the K−K1 radio signal(s); the K−K1 first-type parameter(s) is(are) related to one of the K1 first-type parameter(s) corresponding to one of the K1 radio signal(s), or, the K0 sequentially-arranged parameters and relative position(s) of the K−K1 radio signal(s) are used for determining the K−K1 first-type parameter(s), one of the K−K1 first-type parameter(s) corresponding to an earliest one of the K−K1 radio signal(s) is the first parameter of the K0 sequentially-arranged parameters.

In one embodiment, the second transmitter 1301 also transmits second information; transmits third information; and transmits a second signaling in a first time-frequency-resource-group set; wherein the second information indicates a first identifier, and the second signaling carries the first identifier; the third information is used for indicating the first time-frequency-resource-group set, and the second signaling is a physical-layer signaling; whether a receiver of the first signaling detects the second signaling in the first time-frequency-resource-group set is used for determining the K symbol groups.

In one embodiment, when the receiver of the first signaling detects the second signaling in the first time-frequency-resource-group set, the second signaling is used for indicating a first slot format, and the first slot format and the first information are used together for determining the K symbol groups out of the first symbol set.

In one embodiment, K−K1 symbol group(s) of the K symbol groups belong(s) to the second symbol subset, K1 being a positive integer less than the K; the implementation is receiving, the first slot format is used for indicating that the type of each multicarrier symbol in the K−K1 symbol group(s) is UL, or the first slot format is used for indicating that the type of each multicarrier symbol in the K−K1 symbol group(s) is UL or Flexible; or, the implementation is transmitting, the first slot format is used for indicating that the type of each multicarrier symbol in the K−K1 symbol group(s) is DL, or the first slot format is used for indicating that the type of each multicarrier symbol in the K−K1 symbol group(s) is DL or Flexible.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:
1. A first node for wireless communication, comprising:
a first receiver, receiving first information; receiving a first signaling, the first signaling being used for indicating a first symbol set; wherein the first symbol set comprises N multicarrier symbol groups, any of the N multicarrier symbol groups comprises a positive integer number of multicarrier symbols, the N multicarrier symbol groups are orthogonal, the N multicarrier symbol groups are consecutive, N being a positive integer, the N is greater than 1; the first signaling indicates an earliest one of the N multicarrier symbol groups and the N; and
a first transceiver, operating K radio signals respectively in K symbol groups in the first symbol set, K being a positive integer greater than 1;
wherein the first signaling is a Downlink Control Information (DCI) signaling; the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is carried by a Radio Resource Control (RRC) signaling; the first information is used for indicating a type of each multicarrier symbol in the first symbol set, and the first information is used for determining the first symbol subset and the second symbol subset, the first symbol subset and the second symbol subset do not comprise a multicarrier symbol indicated by the first information that a type is DL; any group of the K symbol groups belongs to one of the first symbol subset and the second symbol subset; each of K1 symbol group(s) of the K symbol groups belongs to the first symbol subset, and each of K–K1 symbol group(s) other than the K1 symbol group(s) of the K symbol groups belongs to the second symbol subset, K1 being a positive integer less than the K; each of the K radio signals carries a first bit block, the K radio signals are respectively K repeat transmissions of the first bit block, the first bit block is transmitted in only the K symbol groups in the first symbol set, the first bit block comprises a transport block (TB), the first bit block comprising a positive integer number of bit(s), the K radio signals respectively correspond to K first-type parameters, the first-type parameter comprises a RV value and the K first-type parameters are related to symbol subsets to which the K symbol groups respectively belong; the operation is transmitting.

2. The first node according to claim 1, wherein the first signaling is used for determining K0 sequentially-arranged parameters, K0 being a positive integer greater than 1; the K first-type parameters are related to the K0 sequentially-arranged parameters and symbol groups of the K symbol groups respectively belonging to the first symbol subset and the second symbol subset.

3. The first node according to claim 1, wherein the K first-type parameters are respectively RV values of the K radio signals, the first signaling is used for determining K0 sequentially-arranged parameters, K0 being a positive integer greater than 1; any of the K first-type parameters is one of the K0 sequentially-arranged parameters; K1 radio signal(s) of the K radio signals is(are) respectively transmitted in the K1 symbol group(s), and K1 first-type parameter(s) of the K first-type parameters respectively correspond(s) to the K1 radio signal(s); the K0 sequentially-arranged parameters and relative position(s) of the K1 radio signal(s) are used for determining the K1 first-type parameter(s), one of the K1 first-type parameter(s) corresponding to an earliest one of the K1 radio signal(s) is a first parameter of the K0 sequentially-arranged parameters; K1 is a positive integer not greater than the K;
a given radio signal is any of the K1 radio signal(s), a given first-type parameter is one of the K1 first-type parameter(s) corresponding to the given radio signal; the given radio signal is a k+1th radio signal of the K1 radio signal(s), a relative position of the given radio signal is k, the k being a non-negative integer less than the K1, a position of the given first-type parameter of the K0 sequentially-arranged parameters is k mod K0, and the given first-type parameter is a (k mod K0)+1th parameter of the K0 sequentially-arranged parameters.

4. The first node according to claim 3, wherein the K is greater than 1, the K1 is less than the K, each of the K–K1 symbol group(s) of the K symbol groups belongs to the second symbol subset; K–K1 radio signal(s) of the K radio signals is(are) respectively transmitted in the K–K1 symbol group(s), and K–K1 first-type parameter(s) of the K first-type parameters respectively correspond(s) to the K–K1 radio signal(s);
the K–K1 first-type parameter(s) is(are) related to one of the K1 first-type parameter(s) corresponding to one of the K1 radio signal(s), a third radio signal is one of the K1 radio signal(s), and the K–K1 first-type parameter(s) is(are) related to one of the K1 first-type parameter(s) corresponding to the third radio signal; the third radio signal is an earliest one of the K1 radio signal(s); or, the K0 sequentially-arranged parameters and relative position(s) of the K–K1 radio signal(s) are used for determining the K–K1 first-type parameter(s), one of the K–K1 first-type parameter(s) corresponding to an earliest one of the K–K1 radio signal(s) is the first parameter of the K0 sequentially-arranged parameters.

5. The first node according to claim 1, wherein the first signaling indicates times of nominal repeat transmissions of the first bit block, and the K is actual repeat-transmission times of the first bit block; the N multicarrier symbol groups are respectively reserved for N nominal repeat transmissions of the first bit block, an earliest one of the N multicarrier symbol groups is a first nominal repeat transmission of the N nominal repeat transmissions, the N being times of nominal repeat transmissions.

6. The first node according to claim 1, wherein numbers of multicarrier symbols respectively comprised in the N multicarrier symbol groups are the same;
or, the first information comprises tdd-UL-DL-ConfigurationCommon, or the first information comprises tdd-UL-DL-ConfigurationCommon and tdd-UL-DL-ConfigDedicated;
or, the first-type parameter comprises a Quasi Co-Located (QCL) parameter, the QCL parameter is a Spatial Tx parameter or the QCL parameter is transmitting spatial filtering; or, the first-type parameter comprises frequency-domain resources.

7. A second node for wireless communication, comprising:
a second transmitter, transmitting first information; and transmitting a first signaling, the first signaling being used for indicating a first symbol set; wherein the first symbol set comprises N multicarrier symbol groups, any of the N multicarrier symbol groups comprises a positive integer number of multicarrier symbols, the N multicarrier symbol groups are orthogonal, the N multicarrier symbol groups are consecutive, N being a positive integer, the N is greater than 1; the first signaling indicates an earliest one of the N multicarrier symbol groups and the N; and
a second transceiver, implementing K radio signals respectively in K symbol groups in the first symbol set, K being a positive integer greater than 1;
wherein the first signaling is a Downlink Control Information (DCI) signaling; the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is carried by a Radio Resource Control (RRC) signaling; the first information is used for indicating a type of each multicarrier symbol in the first symbol set, and the first information is used for determining the first symbol subset and the second symbol subset, the first symbol subset and the second symbol subset do not comprise a multicarrier symbol indicated by the first information that a type is DL; any group of the K symbol groups belongs to one of the first symbol subset and the second symbol subset; each of K1 symbol group(s) of the K symbol groups belongs to the first symbol subset, and each of K−K1 symbol group(s) other than the K1 symbol group(s) of the K symbol groups belongs to the second symbol subset, K1 being a positive integer less than the K; each of the K radio signals carries a first bit block, the K radio signals are respectively K repeat transmissions of the first bit block, the first bit block is transmitted in only the K symbol groups in the first symbol set, the first bit block comprises a transport block (TB), the first bit block comprising a positive integer number of bit(s), the K radio signals respectively correspond to K first-type parameters, the first-type parameter comprises a RV value and the K first-type parameters are related to symbol subsets to which the K symbol groups respectively belong; the implementation is receiving.

8. The second node according to claim 7, wherein the first signaling is used for determining K0 sequentially-arranged parameters, K0 being a positive integer greater than 1; the K first-type parameters are related to the K0 sequentially-arranged parameters and symbol groups of the K symbol groups respectively belonging to the first symbol subset and the second symbol subset.

9. The second node according to claim 7, wherein the K first-type parameters are respectively RV values of the K radio signals, the first signaling is used for determining K0 sequentially-arranged parameters, K0 being a positive integer greater than 1; any of the K first-type parameters is one of the K0 sequentially-arranged parameters; K1 radio signal(s) of the K radio signals is(are) respectively transmitted in the K1 symbol group(s), and K1 first-type parameter(s) of the K first-type parameters respectively correspond(s) to the K1 radio signal(s); the K0 sequentially-arranged parameters and relative position(s) of the K1 radio signal(s) are used for determining the K1 first-type parameter(s), one of the K1 first-type parameter(s) corresponding to an earliest one of the K1 radio signal(s) is a first parameter of the K0 sequentially-arranged parameters; K1 is a positive integer not greater than the K;

a given radio signal is any of the K1 radio signal(s), a given first-type parameter is one of the K1 first-type parameter(s) corresponding to the given radio signal; the given radio signal is a k+1th radio signal of the K1 radio signal(s), a relative position of the given radio signal is k, the k being a non-negative integer less than the K1, a position of the given first-type parameter of the K0 sequentially-arranged parameters is k mod K0, and the given first-type parameter is a (k mod K0)+1th parameter of the K0 sequentially-arranged parameters.

10. The second node according to claim 9, wherein the K is greater than 1, the K1 is less than the K, each of the K−K1 symbol group(s) of the K symbol groups belongs to the second symbol subset; K−K1 radio signal(s) of the K radio signals is(are) respectively transmitted in the K−K1 symbol group(s), and K−K1 first-type parameter(s) of the K first-type parameters respectively correspond(s) to the K−K1 radio signal(s);

the K−K1 first-type parameter(s) is(are) related to one of the K1 first-type parameter(s) corresponding to one of the K1 radio signal(s), a third radio signal is one of the K1 radio signal(s), and the K−K1 first-type parameter(s) is(are) related to one of the K1 first-type parameter(s) corresponding to the third radio signal; the third radio signal is an earliest one of the K1 radio signal(s); or, the K0 sequentially-arranged parameters and relative position(s) of the K−K1 radio signal(s) are used for determining the K−K1 first-type parameter(s), one of the K−K1 first-type parameter(s) corresponding to an earliest one of the K−K1 radio signal(s) is the first parameter of the K0 sequentially-arranged parameters.

11. The second node according to claim 7, wherein the first signaling indicates times of nominal repeat transmissions of the first bit block, and the K is actual repeat-transmission times of the first bit block; the N multicarrier symbol groups are respectively reserved for N nominal repeat transmissions of the first bit block, an earliest one of the N multicarrier symbol groups is a first nominal repeat transmission of the N nominal repeat transmissions, the N being times of nominal repeat transmissions;

or, numbers of multicarrier symbols respectively comprised in the N multicarrier symbol groups are the same;

or, the first information comprises tdd-UL-DL-ConfigurationCommon, or the first information comprises tdd-UL-DL-ConfigurationCommon and tdd-UL-DL-ConfigDedicated;

or, the first-type parameter comprises a Quasi Co-Located (QCL) parameter, the QCL parameter is a Spatial Tx parameter or the QCL parameter is transmitting spatial filtering; or, the first-type parameter comprises frequency-domain resources.

12. A method in a first node for wireless communication, comprising:
receiving first information;
receiving a first signaling, the first signaling being used for indicating a first symbol set; wherein the first symbol set comprises N multicarrier symbol groups, any of the N multicarrier symbol groups comprises a positive integer number of multicarrier symbols, the N multicarrier symbol groups are orthogonal, the N multicarrier symbol groups are consecutive, N being a positive integer, the N is greater than 1; the first signaling indicates an earliest one of the N multicarrier symbol groups and the N; and
operating K radio signals respectively in K symbol groups in the first symbol set, K being a positive integer greater than 1;
wherein the first signaling is a Downlink Control Information (DCI) signaling; the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is carried by a Radio Resource Control (RRC) signaling; the first information is used for indicating a type of each multicarrier symbol in the first symbol set, and the first information is used for determining the first symbol subset and the second symbol subset, the first symbol subset and the second symbol subset do not comprise a multicarrier symbol indicated by the first information that a type is DL; any group of the K symbol groups belongs to one of the first symbol subset and the second symbol subset; each of K1 symbol group(s) of the K symbol groups belongs to the first symbol subset, and each of K−K1 symbol group(s) other than the K1 symbol group(s) of the K symbol groups belongs to the second symbol subset, K1 being a positive integer less than the K; each of the K radio signals carries a first bit block, the K radio signals are respectively K repeat transmissions of the first bit block, the first bit block is transmitted in only the K symbol groups in the first symbol set, the first bit block comprises a transport block (TB), the first bit block comprising a positive integer number of bit(s), the K radio signals respectively correspond to K first-type parameters, the first-type parameter comprises a RV value and the K first-type parameters are related to symbol subsets to which the K symbol groups respectively belong; the operation is transmitting.

13. The method according to claim 12, wherein the first signaling is used for determining K0 sequentially-arranged parameters, K0 being a positive integer greater than 1; the K first-type parameters are related to the K0 sequentially-arranged parameters and symbol groups of the K symbol groups respectively belonging to the first symbol subset and the second symbol subset.

14. The method according to claim 12, wherein the K first-type parameters are respectively RV values of the K radio signals, the first signaling is used for determining K0 sequentially-arranged parameters, K0 being a positive integer greater than 1; any of the K first-type parameters is one of the K0 sequentially-arranged parameters; K1 radio signal(s) of the K radio signals is(are) respectively transmitted in the K1 symbol group(s), and K1 first-type parameter(s) of the K first-type parameters respectively correspond(s) to the K1 radio signal(s); the K0 sequentially-arranged parameters and relative position(s) of the K1 radio signal(s) are used for determining the K1 first-type parameter(s), one of the K1 first-type parameter(s) corresponding to an earliest one of the K1 radio signal(s) is a first parameter of the K0 sequentially-arranged parameters; K1 is a positive integer not greater than the K;
a given radio signal is any of the K1 radio signal(s), a given first-type parameter is one of the K1 first-type parameter(s) corresponding to the given radio signal; the given radio signal is a k+1th radio signal of the K1 radio signal(s), a relative position of the given radio signal is k, the k being a non-negative integer less than the K1, a position of the given first-type parameter of the K0 sequentially-arranged parameters is k mod K0, and the given first-type parameter is a (k mod K0)+1th parameter of the K0 sequentially-arranged parameters.

15. The method according to claim 14, wherein the K is greater than 1, the K1 is less than the K, each of the K−K1 symbol group(s) of the K symbol groups belongs to the second symbol subset; K−K1 radio signal(s) of the K radio signals is(are) respectively transmitted in the K−K1 symbol group(s), and K−K1 first-type parameter(s) of the K first-type parameter(s) respectively correspond(s) to the K−K1 radio signal(s);
the K−K1 first-type parameter(s) is(are) related to one of the K1 first-type parameter(s) corresponding to one of the K1 radio signal(s), a third radio signal is one of the K1 radio signal(s), and the K−K1 first-type parameter(s) is(are) related to one of the K1 first-type parameter(s) corresponding to the third radio signal; the third radio signal is an earliest one of the K1 radio signal(s); or, the K0 sequentially-arranged parameters and relative position(s) of the K−K1 radio signal(s) are used for determining the K−K1 first-type parameter(s), one of the K−K1 first-type parameter(s) corresponding to an earliest one of the K−K1 radio signal(s) is the first parameter of the K0 sequentially-arranged parameters.

16. The method according to claim 12, wherein the first signaling indicates times of nominal repeat transmissions of the first bit block, and the K is actual repeat-transmission times of the first bit block; the N multicarrier symbol groups are respectively reserved for N nominal repeat transmissions of the first bit block, an earliest one of the N multicarrier symbol groups is a first nominal repeat transmission of the N nominal repeat transmissions, the N being times of nominal repeat transmissions.

17. The method according to claim 12, wherein numbers of multicarrier symbols respectively comprised in the N multicarrier symbol groups are the same;
or, the first information comprises tdd-UL-DL-ConfigurationCommon, or the first information comprises tdd-UL-DL-ConfigurationCommon and tdd-UL-DL-ConfigDedicated;
or, the first-type parameter comprises a Quasi Co-Located (QCL) parameter, the QCL parameter is a Spatial Tx parameter or the QCL parameter is transmitting spatial filtering; or, the first-type parameter comprises frequency-domain resources.

18. A method in a second node for wireless communication, comprising:
transmitting first information;
transmitting a first signaling, the first signaling being used for indicating a first symbol set; wherein the first symbol set comprises N multicarrier symbol groups, any of the N multicarrier symbol groups comprises a positive integer number of multicarrier symbols, the N multicarrier symbol groups are orthogonal, the N multicarrier symbol groups are consecutive, N being a positive integer, the N is greater than 1; the first signaling indicates an earliest one of the N multicarrier symbol groups and the N; and
implementing K radio signals respectively in K symbol groups in the first symbol set, K being a positive integer greater than 1;
wherein the first signaling is a Downlink Control Information (DCI) signaling; the first symbol set comprises a positive integer number of multicarrier symbols, any group of the K symbol groups comprises a positive integer number of multicarrier symbol(s), any two of the K symbol groups are orthogonal, and any multicarrier symbol in the K symbol groups belongs to the first symbol set; the first symbol set comprises a first symbol subset and a second symbol subset, the first information is carried by a Radio Resource Control (RRC) signaling; the first information is used for indicating a type of each multicarrier symbol in the first symbol set, and the first information is used for determining the first symbol subset and the second symbol subset, the first symbol subset and the second symbol subset do not comprise a multicarrier symbol indicated by the first information that a type is DL; any group of the K symbol groups belongs to one of the first symbol subset and the second symbol subset; each of K1 symbol group(s) of the K symbol groups belongs to the first symbol subset, and each of K−K1 symbol group(s) other than the K1 symbol group(s) of the K symbol groups belongs to the second symbol subset, K1 being a positive integer less than the K; each of the K radio signals carries a first bit block, the K radio signals are respectively K repeat transmissions of the first bit block, the first bit block is transmitted in only the K symbol groups in the first symbol set, the first bit block comprises a transport block (TB), the first bit block comprising a positive integer number of bit(s), the K radio signals respectively correspond to K first-type parameters, the first-type parameter comprises a RV value and the K first-type parameters are related to symbol subsets to which the K symbol groups respectively belong; the implementation is receiving.

19. The method according to claim 18, wherein the first signaling is used for determining K0 sequentially-arranged parameters, K0 being a positive integer greater than 1; the K first-type parameters are related to the K0 sequentially-arranged parameters and symbol groups of the K symbol groups respectively belonging to the first symbol subset and the second symbol subset.

20. The method according to claim 18, wherein the K first-type parameters are respectively RV values of the K radio signals, the first signaling is used for determining K0 sequentially-arranged parameters, K0 being a positive integer greater than 1; any of the K first-type parameters is one of the K0 sequentially-arranged parameters; K1 radio signal(s) of the K radio signals is(are) respectively transmitted in the K1 symbol group(s), and K1 first-type parameter(s) of the K first-type parameters respectively correspond(s) to the K1 radio signal(s); the K0 sequentially-arranged parameters and relative position(s) of the K1 radio signal(s) are used for determining the K1 first-type parameter(s), one of the K1 first-type parameter(s) corresponding to an earliest one of the K1 radio signal(s) is a first parameter of the K0 sequentially-arranged parameters; K1 is a positive integer not greater than the K;

a given radio signal is any of the K1 radio signal(s), a given first-type parameter is one of the K1 first-type parameter(s) corresponding to the given radio signal; the given radio signal is a k+1th radio signal of the K1 radio signal(s), a relative position of the given radio signal is k, the k being a non-negative integer less than the K1, a position of the given first-type parameter of the K0 sequentially-arranged parameters is k mod K0, and the given first-type parameter is a (k mod K0)+1th parameter of the K0 sequentially-arranged parameters.

* * * * *